(12) United States Patent
Makuta

(10) Patent No.: US 9,452,618 B2
(45) Date of Patent: Sep. 27, 2016

(54) INKJET RECORDING METHOD AND PRINTED MATERIAL

(71) Applicant: FUJIFILM Corporation, Tokyo (JP)

(72) Inventor: Toshiyuki Makuta, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 53 days.

(21) Appl. No.: 14/455,318

(22) Filed: Aug. 8, 2014

(65) Prior Publication Data

US 2015/0049149 A1 Feb. 19, 2015

(30) Foreign Application Priority Data

Aug. 16, 2013 (JP) .................. 2013-169149

(51) Int. Cl.
*B41J 2/21* (2006.01)
*B41J 11/00* (2006.01)
(Continued)

(52) U.S. Cl.
CPC ............ *B41J 11/002* (2013.01); *B41J 2/2107* (2013.01); *C09D 11/101* (2013.01); *C09D 11/30* (2013.01)

(58) Field of Classification Search
CPC .......... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218

USPC ..................................................... 347/95–105
See application file for complete search history.

(56) References Cited

U.S. PATENT DOCUMENTS 4,425,403 A * 1/1984 Taniguchi ............... B29C 59/14
264/1.8
7,500,745 B2 * 3/2009 Ushirogouchi ........ B41J 2/0057
347/100

(Continued)

FOREIGN PATENT DOCUMENTS

JP 2003-200564 A 7/2003
JP 2007-057983 A 3/2007

(Continued)

*Primary Examiner* — Manish S Shah
(74) *Attorney, Agent, or Firm* — Studebaker & Brackett PC

(57) ABSTRACT

An inkjet recording method including applying an undercoat solution onto a transparent recording medium, semi-curing the undercoat solution, discharging an ink composition onto the semi-cured undercoat solution, and carrying out overall curing of the semi-cured undercoat solution and the ink composition by exposure under an low oxygen atmosphere after the image formation, the undercoat solution comprising two or more types of polymers and/or oligomers from among polymers and oligomers having a structure selected from the group consisting of a polyester structure, a polyurethane structure, and a chlorinated polyolefin structure, the ink composition comprising at least 95 parts of a polyfunctional ethylenically unsaturated compound relative to 100 parts of the total content of ethylenically unsaturated compound, and at least 5 parts of a polyalkylene glycol diacrylate, and exposure in the overall curing being carried out from both the image formation face and the reverse face of the recording medium.

12 Claims, 2 Drawing Sheets

(51) Int. Cl.
*C09D 11/101* (2014.01)
*C09D 11/30* (2014.01)

(56) References Cited

U.S. PATENT DOCUMENTS

2008/0238998 A1* 10/2008 Nakazawa ............. B41J 11/002
 347/42
2008/0286484 A1* 11/2008 Tojo ..................... B41M 7/0081
 427/511
2009/0087626 A1* 4/2009 Hayata ................. C09D 11/101
 428/195.1
2009/0135239 A1* 5/2009 Chretien ................ B41J 11/002
 347/102
2011/0169902 A1* 7/2011 Hayata ................... C09D 11/30
 347/102
2011/0169903 A1* 7/2011 Hayata ................... C09D 11/32
 347/102

FOREIGN PATENT DOCUMENTS

JP 2008-105375 A 5/2008
JP 2008-105387 A 5/2008
JP 2009-083267 A 4/2009

\* cited by examiner

INKJET RECORDING METHOD AND PRINTED MATERIAL

CROSS REFERENCE TO RELATED APPLICATIONS

This application claims priority under U.S.C. 119 from Japanese Patent Application No. 2013-169149 filed on Aug. 16, 2013, the entire contents of which are incorporated by reference herein.

FIELD OF THE INVENTION

The present invention relates to an inkjet recording method and a printed material.

DESCRIPTION OF THE RELATED ART

Printing of flexible packaging has until now mainly been carried out by a conventional printing method such as gravure printing or flexographic printing. However, in recent years digital printing, to meet the increase in small lot printing, has been attracting attention in the field of flexible packaging also. In the case of digital printing, it is unnecessary to make a plate, it is also unnecessary to carry out color matching, and in the case of small lot printing in particular it is possible to achieve a low cost and, moreover, since the preparation time can be cut it results in a reduction in printing time.

As main digital printing methods, an electrophotographic method and an inkjet method can be cited. In the electrophotographic method, a dry electrophotographic method is not suitable for a plastic substrate and is difficult to use in this field, but a wet electrophotographic method has been applied to this field effectively. However, although the electrophotographic method is effective for use in proofing, there are disadvantages such as low productivity and high relative cost.

On the other hand, the inkjet method is a more effective method than the electrophotographic method from the viewpoint of high productivity and cost. Inkjet can be classified roughly in terms of the inks used into aqueous inkjet, oil-based inkjet, and UV curable inkjet.

As conventional inkjet recording methods, methods described in JP-A-2009-83267 (JP-A denotes a Japanese unexamined patent application publication), JP-A-2008-105387, JP-A-2008-105375, JP-A-2007-54983, and JP-A-2003-200564 can be cited.

An inkjet recording method employing an aqueous ink is an excellent method in terms of safety, but there is a difficulty with adhesion to a plastic substrate such as polypropylene, polyethylene terephthalate (PET), or nylon, which are substrates used in the field of flexible packaging. As a method for improving this, a method in which latex is added to an aqueous ink is known, but due to the use of water as a solvent it takes a long time to dry and it is difficult to achieve high productivity. An inkjet recording method employing an oil-based ink can carry out recording when polyvinyl chloride is used as a substrate, but adhesion is difficult to the above plastic substrates such as polypropylene, PET, and nylon. Furthermore, due to VOCs (Volatile Organic Compounds) being generated it has the disadvantage that there is an adverse effect on the environment.

On the other hand, the UV curable inkjet method has high substrate suitability, and adhesion to the above plastic substrates such as polypropylene, PET, or nylon is possible. Furthermore, due to the use of a UV curable ink there is the advantage that high speed drying properties are excellent. However, a substance that is used as a vehicle is a UV curable monomer, represented by an acrylate compound, and it can be expected that when uncured monomer remains it will cause an odor and leach out from a printed material. The present inventors have found that, since the main application of flexible packaging is food packaging, odor or leaching out of uncured monomer is a serious problem.

Furthermore, in the inkjet recording methods described in JP-A-2009-83267, etc., a method in which an undercoat solution is discharged and then semi-cured, and a UV curable ink is imagewise applied thereonto has been disclosed. However, the present inventors have found that when this method is applied to flexible packaging printing, in evaluation of flexibility for a case of crumpling an image area with the hands, there is the problem that cracking occurs in the image area.

It is an object of the present invention to provide an inkjet recording method that can give a printed material having good image adhesion, excellent flexibility and image quality, and suppressed odor even when polypropylene, polyethylene terephthalate, or nylon is used as a recording medium, and a printed material.

Means for Solving the Problems

The object of the present invention has been attained by means described in <1> and <11> below. They are described below together with <2> to <10>, which are preferred embodiments.

<1> An inkjet recording method comprising an undercoating step of applying an undercoat solution onto a transparent recording medium, a semi-curing step of semi-curing the undercoat solution, an image formation step of carrying out image formation by discharging an ink composition onto the semi-cured undercoat solution, and an overall curing step of carrying out overall curing of the semi-cured undercoat solution and the ink composition by exposure under an atmosphere having an oxygen concentration of no greater than 1 vol % after the image formation, the undercoat solution comprising two or more types of polymers and/or oligomers from among polymers and oligomers having a structure selected from the group consisting of a polyester structure, a polyurethane structure, and a chlorinated polyolefin structure, the ink composition comprising at least 95 parts by mass of a polyfunctional ethylenically unsaturated compound relative to 100 parts by mass of the total content of ethylenically unsaturated compound in the ink composition, and at least 5 parts by mass of a polyalkylene glycol diacrylate, and exposure in the overall curing step being carried out from both the image formation face and the reverse face of the recording medium, <2> the inkjet recording method according to <1>, wherein the exposure wavelength in the semi-curing step is different from the exposure wavelength in the overall curing step, <3> the inkjet recording method according to <1> or <2>, wherein the undercoat solution comprises two or more types of polymerization initiators, <4> the inkjet recording method according to <3>, wherein the undercoat solution comprises at least one type of polymerization initiator having a main absorption in the vicinity of the exposure wavelength in the semi-curing step and at least one type of polymerization initiator having a main absorption in the vicinity of the exposure wavelength in the overall curing step, <5> the inkjet recording method according to any one of <1> to <4>, wherein the undercoat solution comprises at least one type of polymerization initiator that does not decompose in the semi-curing step but does decompose in the overall curing step, <6> the inkjet recording method according to any one of <1> to <5>, wherein the undercoat solution comprises 2-methyl-1-(4-methylthiophenyl)-2-morpholinopropan-1-one and a compound selected from the group consisting of 2-benzyl-2-dimethylamino-1-(4-morpholinophenyl)-1-butanone, 2-(dimethylamino)-2-[(4-methylphenyl)methyl]-1-[4-(4-morpholinyl)phenyl]-1-butanone, bis(2,4,6-trimethylbenzoyl)phenylphosphine oxide, and bis(2,6-dimethoxybenzoyl)-2,4,4-trimethylpentylphenylphosphine oxide, <7> the inkjet recording method according to any one of <1> to <6>, wherein the polymer or oligomer having at least a structure selected from the group consisting of a polyester structure, a polyurethane structure, and a chlorinated polyolefin structure comprises an ethylenically unsaturated group, <8> the inkjet recording method according to <7>, wherein the polymer or oligomer having at least a structure selected from the group consisting of a polyester structure, a polyurethane structure, and a chlorinated polyolefin structure comprises a (meth)acryloxy group, <9> the inkjet recording method according to any one of <1> to <8>, wherein the ink composition comprises a hydrocarbon diol di(meth)acrylate, <10> the inkjet recording method according to any one of <1> to <9>, wherein the ink composition comprises a compound represented by Formula (1) or Formula (2) below

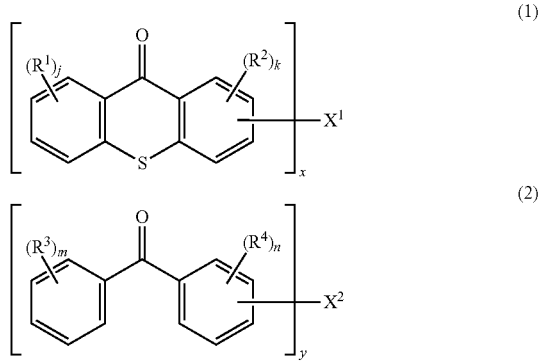

wherein in Formula (1) and Formula (2), $R^1$, $R^2$, $R^3$, and $R^4$ independently denote an alkyl group having 1 to 5 carbons or a halogen atom, x and y independently denote an integer of 2 to 4, j and m independently denote an integer of 0 to 4, k and n independently denote an integer of 0 to 3, when j, k, m, or n is an integer of 2 or more, the plurality of $R^1$s, $R^2$s, $R^3$s, or $R^4$s may be identical to or different from each other, $X^1$ denotes an x-valent linking group comprising at least any one of a hydrocarbon chain, an ether bond, and an ester bond, and $X^2$ denotes a y-valent linking group comprising at least any one of a hydrocarbon chain, an ether bond, and an ester bond, and <11> a printed material obtained by the inkjet recording method according to any one of <1> to <10>.

EXPLANATION OF REFERENCE NUMERALS AND SYMBOLS

Figure 1:
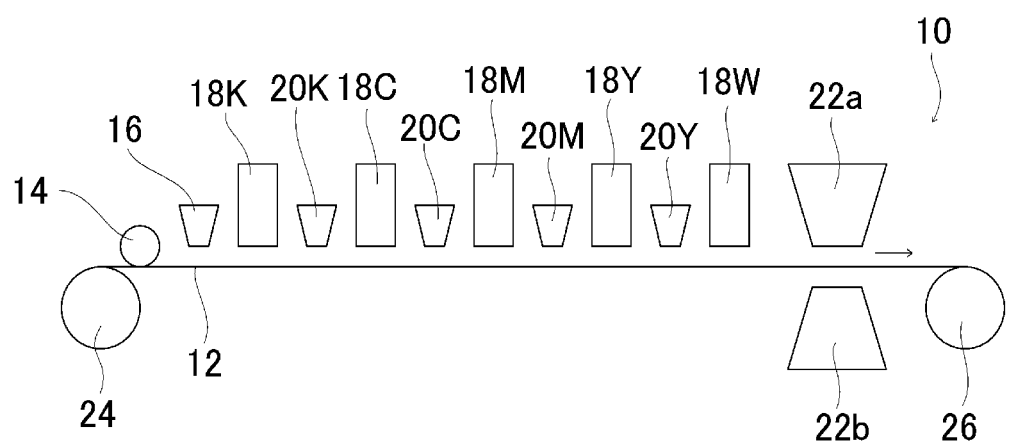
FIG. 1: A schematic drawing showing one example of inkjet recording equipment that is suitably used in the present invention.

10: image formation equipment, 12: transparent recording medium, 14: undercoat solution application roller, 16: undercoat solution semi-curing exposure light source, 18K, 18C, 18M, 18Y, 18W: inkjet head, 20K, 20C, 20M, 20Y: semi-curing exposure light source, 22, 22a, 22b: nitrogen-purged exposure light source unit, 24: outfeed roller, 26: wind-up roller, arrow: direction of transport of transparent recording medium.

Modes for Carrying Out the Invention

In the present invention, the notation 'A to B', which expresses a numerical range, means 'at least A but no greater than B' unless otherwise specified. Furthermore, '(Component A) a polymerizable compound', etc., may simply be called 'Component A', etc. In addition, 'mass %' and 'parts by mass' have the same meanings as 'wt %' and 'parts by weight' respectively.

Moreover, in the present invention '(meth)acrylate' means both or either of 'acrylate' and 'methacrylate', and '(meth) acrylic' means both or either of 'acrylic' and 'methacrylic'.

In the present invention, a combination of preferred embodiments is more preferable embodiment.

The present invention is explained in detail below.
(Inkjet Recording Method)

The inkjet recording method of the present invention comprises an undercoating step of applying an undercoat solution onto a transparent recording medium, a semi-curing step of semi-curing the undercoat solution, an image formation step of carrying out image formation by discharging an ink composition onto the semi-cured undercoat solution, and an overall curing step of carrying out overall curing of the semi-cured undercoat solution and the ink composition by exposure under an atmosphere having an oxygen concentration of no greater than 1 vol % after the image formation, the undercoat solution comprising two or more types of polymers and/or oligomers from among polymers and oligomers having a structure selected from the group consisting of a polyester structure, a polyurethane structure, and a chlorinated polyolefin structure, the ink composition comprising at least 95 parts by mass of a polyfunctional ethylenically unsaturated compound relative to 100 parts by mass of the total content of ethylenically unsaturated compound in the ink composition, and at least 5 parts by mass of a polyalkylene glycol diacrylate, and exposure in the overall curing step being carried out from both the image formation face and the reverse face of the recording medium.

Furthermore, the inkjet recording method of the present invention is suitable for printing of flexible packaging, more suitable for packaging printing, and particularly suitable for packaging printing of food packaging.

As a mechanism via which the effects of the present invention are exhibited, the following mechanism can be inferred.

It is surmised that, due to the ink composition used in the present invention comprising at least 95 parts by mass of a polyfunctional ethylenically unsaturated compound relative to 100 parts by mass of the total content of ethylenically unsaturated compound in the ink composition and at least 5 parts by mass of a polyalkylene glycol diacrylate, a printed material having suppressed odor can be obtained, but it is also surmised that, due to it comprising at least 95 parts by mass of a polyfunctional ethylenically unsaturated compound, a film becomes hard and shrinkage is also large, image cracking and adhesion thereby being degraded.

However, as a result of an intensive investigation, the present inventor has found that there can be provided an inkjet recording method of the present invention that can give a printed material having good image adhesion, excellent flexibility and image quality, and suppressed odor even, when the above-mentioned ink composition comprising at least 95 parts by mass of a polyfunctional ethylenically unsaturated compound relative to 100 parts by mass of the total content of ethylenically unsaturated compound in the ink composition is used.

Furthermore, it is surmised that, due to the undercoat solution used in the present invention comprising a specific polymer or oligomer, when it is cured substrate adhesion and flexibility are excellent.

Moreover, it is surmised that, by semi-curing an undercoat solution and firing a droplet of an ink composition onto it, due to the undercoat solution being in a semi-cured state, an uncured section mixes with the ink composition and then cures, the undercoat solution material and the ink composition material form covalent bonding to thus ensure adhesion between the undercoat solution and the ink composition and, moreover, the ink composition is mixed with a specific polymer or oligomer contained in the undercoat solution, thus improving the flexibility of an ink composition cured film and thereby improving image cracking.

Furthermore, it is surmised that if exposure is carried out only from one face in overall curing, curing in a section where the undercoat solution and the ink composition are mixed becomes insufficient, curing of a section where only the ink composition is present progresses, and image cracking in that section cannot be improved. On the other hand, if exposure is carried out from both faces, it is surmised that curing can be carried out to the interior all at once, and the undercoat solution-ink composition mixed layer can also be cured sufficiently, thus ensuring adhesion and flexibility.

<Undercoating Step>

The inkjet recording method of the present invention comprises an undercoating step of applying an undercoat solution onto a transparent recording medium.

The undercoat solution comprises two or more types of polymers and/or oligomers from among polymers and oligomers having at least a structure selected from the group consisting of a polyester structure, a polyurethane structure, and a chlorinated polyolefin structure.

In the undercoating step, the undercoat solution may be applied to the entire face or only a part of an image formation face of a transparent recording medium, but is preferably applied to the entire face of an image formation face of a transparent recording medium.

A preferred mode of the undercoat solution in the present invention is explained in detail later.

The recording medium (support, recording material, etc.) used in the inkjet recording method of the present invention is not particularly limited as long as it is a transparent recording medium, and a known transparent recording medium may be used.

In the present invention, being 'transparent' means having a visible light transmittance of at least 80%, and preferably a visible light transmittance of at least 90%. The transparent recording medium may be colored as long as it is transparent, but is preferably a colorless recording medium.

Specific examples of the transparent recording medium include glass, quartz, and a plastic film (e.g. cellulose diacetate, cellulose triacetate, cellulose propionate, cellulose butyrate, cellulose acetate butyrate, cellulose nitrate, an acrylic resin, a chlorinated polyolefin resin, a polyether sulfone resin, polyethylene terephthalate (PET), polyethylene naphthalate, nylon, polyethylene, polystyrene, polypropylene, a polycycloolefin resin, a polyimide resin, a polycarbonate resin, polyvinyl acetal. etc).

Furthermore, as the transparent recording medium, a mixture of two or more types of the above resins or one formed by layering at least two of these resins may be used.

Among them, the transparent recording medium is preferably a recording medium having an image formation face comprising at least one type of resin selected from the group consisting of a polyolefin resin, a polyester resin, and a polyamide resin, more preferably a recording medium having an image formation face comprising at least one type of resin selected from the group consisting of polypropylene, polyethylene terephthalate, and nylon, yet more preferably a recording medium comprising at least one type of resin selected from the group consisting of polypropylene, polyethylene terephthalate, and nylon, and particularly preferably a recording medium comprising at least one type of resin selected from the group consisting of oriented polypropylene, polyethylene terephthalate, and nylon.

The polypropylene used is preferably CPP (cast polypropylene), OPP (oriented polypropylene), KOP (polyvinylidene chloride-coated OPP), or AOP (PVA-coated OPP), the polyethylene terephthalate used is preferably oriented polyester, and the nylon used is preferably ON (oriented nylon), KON (oriented nylon), or CN (cast nylon).

The thickness of the transparent recording medium is not particularly limited, but is preferably 1 to 500 µm, more preferably 2 to 200 µm, yet more preferably 5 to 100 µm, and particularly preferably 10 to 90 µm.

In the inkjet recording method of the present invention, as means for applying the undercoat composition on top of the transparent recording medium, a coating machine, an inkjet nozzle, etc. may be used.

The coating machine is not particularly limited and may be appropriately selected from known coating machines according to the intended purpose, etc., and examples thereof include an air doctor coater, a blade coater, a rod coater, a knife coater, a squeegee coater, an immersion coater, a reverse roll coater, a transfer roll coater, a gravure coater, a kiss roll coater, a cast coater, a spray coater, a curtain coater, and an extrusion coater. Details may be referred to in 'Kotingu Kogaku (Coating Engineering)' by Yuji Harasaki.

Among them, in terms of equipment cost, application of the undercoat liquid composition on top of the recording medium is preferably carried out by coating using a relatively inexpensive bar coater or spin coater.

In the step of applying the undercoat solution on top of the recording medium, it is preferable to apply the undercoat composition on top of the recording medium in the same region as for an image or in a region that is wider than the image.

Furthermore, with regard to the amount of undercoat composition applied (ratio by weight per unit area), it is preferably at least 0.05 but no greater than 5 when the maximum amount of colored liquid composition applied (per color) is 1, is more preferably at least 0.07 but no greater than 4, and is yet more preferably at least 0.1 but no greater than 3.

<Semi-Curing Step>

The inkjet recording method of the present invention comprises a step of semi-curing (hereinafter, also called a 'step of undercoat semi-curing') an undercoat composition.

In the present invention, 'semi-curing' means partial curing (partially cured; partial curing) and refers to a state in which the undercoat composition (hereinafter, also simply called an 'undercoat liquid') and/or the ink composition (hereinafter, also simply called an 'ink') are partially cured but not completely cured. When the undercoat liquid applied on top of the recording medium (substrate) or the colored liquid discharged on top of the undercoat liquid is semi-cured, the degree of curing may be nonuniform. For example, it is preferable that curing of the undercoat liquid and/or the colored liquid progresses in the depth direction. Preferred examples of confirmation method of semi-curing include a measurement of a degree of unpolymerization, a measurement of a change of a viscosity, and an observation of a condition difference between the surface of the ink composition and the interior of the ink composition, as described later.

Examples of methods for semi-curing an undercoat liquid include a method in which actinic radiation is applied to the undercoat liquid, that is, a method of causing a curing reaction by an exposure.

The method in which actinic radiation or heat is applied so as to cause a semi-curing reaction is a method in which a polymerization reaction of an ethylenically unsaturated compound on the surface of the undercoat liquid applied to a recording medium is incompletely carried out.

As the actinic radiation, $\alpha$ rays, $\gamma$ rays, an electron beam, X rays, visible light, infrared light, etc. may be used other than ultraviolet rays. Among them, ultraviolet rays or visible light are preferable, and ultraviolet rays are more preferable.

The amount of energy necessary for semi-curing the undercoat liquid depends on the type and content of a polymerization initiator, but it is preferably on the order of 1 to 500 mJ/cm$^2$ when energy is provided by actinic radiation.

As an exposure source, a mercury lamp, a gas/solid laser, etc. are mainly used, and for UV photocuring inkjet ink a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, the example of the LED includes a LED, disclosed in U.S. Pat. No. 6,084,250, that can emit actinic radiation whose wavelength is centered between 300 nm and 370 nm. Furthermore, another violet LED is available, and irradiation can be carried out with radiation of a different UV bandwidth. The actinic radiation source preferable in the present invention is a UV-LED, and a UV-LED having a peak wavelength at 350 to 420 nm is particularly preferable.

The maximum illumination intensity of the LED on a recording medium is preferably 10 to 2,000 mW/cm$^2$, more preferably 20 to 1,000 mW/cm$^2$, and particularly preferably 50 to 800 mW/cm$^2$.

Preferred examples of an exposure source for semi-curing the undercoat liquid include a metal halide lamp, a mercury lamp, and a LED light source. Among them, a LED light source is preferable, and a 385 nm LED light source is particularly preferable.

When a radically polymerizable undercoat liquid comprising an ethylenically unsaturated compound is polymerized in an atmosphere containing a large amount of oxygen, such as an atmosphere of air or air partially displaced by an inert gas, radical polymerization tends to be inhibited on the surface of droplets of the undercoat liquid layer applied on top of the recording medium, due to the radical polymerization inhibition effect of oxygen. As a result, semi-curing is nonuniform, curing advances further in the interior of the undercoat liquid layer, and curing of the surface tends to be delayed. The undercoat liquid layer referred to here is the layer of undercoat liquid applied on top of the substrate.

In the semi-curing step, a surface of the undercoat liquid at a side of non-contacting the recording medium is preferably not completely cured.

In the present invention, when a radically photopolymerizable undercoat liquid is used in the presence of oxygen, which inhibits radical polymerization, thus carrying out partial photocuring, curing of the undercoat liquid advances further in the interior than in the exterior.

In particular, the polymerization reaction is easily inhibited on the surface of the undercoat liquid compared with the interior thereof due to the influence of oxygen in the air. It is therefore possible to semi-cure the undercoat liquid by controlling the conditions under which actinic radiation is applied.

In the semi-cured undercoat liquid in the semi-curing step, the surface thereof is preferably not cured, and the interior thereof is preferably cured.

Due to the actinic radiation, generation of an active species as a result of decomposition of a polymerization initiator is promoted, and as a result of an increase in the active species or an increase in temperature a curing reaction by polymerization or crosslinking, by means of the active species, of a polymerizable or crosslinking material is promoted.

Furthermore, increasing the viscosity is also suitably carried out by irradiation with actinic radiation.

In the semi-curing step, when a curing reaction is based on an ethylenically unsaturated compound, the degree of unpolymerization may be measured quantitatively by the reaction ratio of an ethylenically unsaturated group.

When a semi-cured state of the undercoat liquid is realized by a polymerization reaction of a polymerizable compound for which polymerization is initiated by irradiation with actinic radiation, from the viewpoint of improvement of scratch resistance of a printed material, it is preferable for the degree of unpolymerization (A (after polymerization)/A (before polymerization)) to be at least 0.2 but no greater than 0.9, more preferably at least 0.3 but no greater than 0.9, and particularly preferably at least 0.5 but no greater than 0.9.

Here, A (after polymerization) is an infrared absorption peak due to a polymerizable group after the polymerization reaction, and A (before polymerization) is an infrared absorption peak due to the polymerizable group before the polymerization reaction. For example, when the polymerizable compound contained in the undercoat liquid is an acrylate monomer or a methacrylate monomer, an absorption peak due to the polymerizable group (acrylate group, methacrylate group) is observed at around 810 cm$^{-1}$, and the degree of unpolymerization is preferably defined by the absorbance of the peak.

Moreover, as means for measuring an infrared absorption spectrum, a commercial infrared spectrophotometer may be used; either a transmission type or a reflectance type may be used, and it is preferably selected as appropriate depending on the form of a sample. For example, an FTS-6000 infrared spectrophotometer manufactured by Bio-Rad Laboratories, Inc. may be used for measurement.

<Image Formation Step>

The inkjet recording method of the present invention comprises an image formation step of carrying out image formation by discharging an ink composition onto the semi-cured undercoat composition.

Due to the ink composition being discharged onto the undercoat solution in a semi-cured state, the resulting printed material is excellent in terms of image quality and flexibility.

A preferred mode of the ink composition in the present invention is explained in detail later.

As means for applying an ink composition, an inkjet head is preferably used. Preferred examples of the inkjet head include heads employing a charge control system in which an ink is discharged by utilizing an electrostatic attraction force, a drop-on-demand system (pressure pulse system) in which oscillatory pressure of a piezo element is utilized, an acoustic inkjet system in which an electrical signal is changed into an acoustic beam and applied to an ink, and the ink is discharged by utilizing radiation pressure, a thermal inkjet (Bubblejet (registered trademark)) in which a bubble is formed by heating an ink and the pressure thus generated is utilized, etc.

In the image formation step, the ink composition discharges by an inkjet recording method onto the semi-cured undercoat composition.

An inkjet recording device used in the inkjet recording method of the present invention is not particularly limited, and any known inkjet recording device that can achieve an intended resolution may be used. That is, any known inkjet recording device, such as a commercial product, may be used in order to discharge an ink composition onto a recording medium in the image formation step of the inkjet recording method of the present invention.

The inkjet recording device that can be used in the present invention is equipped with, for example, an ink supply system, a temperature sensor, and an actinic radiation source.

The ink supply comprises, for example, a main tank containing the ink composition of the present invention, a supply pipe, an ink composition supply tank immediately before an inkjet head, a filter, and a piezo system inkjet head. The piezo system inkjet head may be driven so as to discharge a multisize dot of preferably 1 to 100 pL, more preferably 3 to 42 pL, and yet more preferably 8 to 30 pL, at a resolution of preferably 320×320 to 4,000×4,000 dpi, more preferably 400×400 to 1,600×1,600 dpi, and yet more preferably 720×720 dpi. Here, dpi referred to in the present invention means the number of dots per 2.54 cm.

As described above, with respect to the radiation curing ink composition such as the ink composition of the present invention, since it is desirable for the ink composition to be discharged at a constant temperature, a section from the ink composition supply tank to the inkjet head is thermally insulated and heated. A method of controlling temperature is not particularly limited, but it is preferable to provide, for example, temperature sensors at a plurality of pipe section positions, and control heating according to the ink composition flow rate and the temperature of the surroundings. The temperature sensors may be provided on the ink composition supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When the ink composition in the image formation step is discharged using the above mentioned inkjet recording device, the ink composition is preferably discharged after being heated to preferably 25° C. to 80° C., and more preferably 25° C. to 50° C., so as to reduce the viscosity of the ink composition to preferably 3 to 15 mPa·s, and more preferably 3 to 13 mPa·s. In particular, it is preferable to use the ink composition having an ink viscosity at 25° C. of no more than 50 mPa·s since good discharge stability can be obtained. By employing this method, high discharge stability can be realized.

It is preferably to maintain the ink composition discharge temperature as constant as possible. In the present invention, the control range for the temperature of ink composition is preferably ±5° C. of a set temperature, more preferably ±2° C. of the set temperature, and yet more preferably ±1° C. of the set temperature.

The droplet firing interval until a droplet of an ink composition is fired after applying an undercoat composition is preferably at least 5 μsec but no greater than 10 sec. The droplet firing interval of ink composition droplets is more preferably at least 10 μsec but no greater than 5 sec, and particularly preferably at least 20 μsec but no greater than 5 sec.

The inkjet recording method of the present invention may comprise a step of semi-curing the discharged ink composition after carrying out image formation by discharging the ink composition onto the semi-cured undercoat solution, but when the overall curing step is carried out immediately thereafter, it is preferable for it not to comprise this semi-curing step.

Furthermore, in the inkjet recording method of the present invention, one type of the ink composition may be used on its own or two or more types thereof may be used.

For example, when a color image is formed, it is preferable to use at least yellow, cyan, magenta, and black ink compositions, and it is more preferable to use at least white, yellow, cyan, magenta, and black ink compositions.

Furthermore, a light color ink composition such as light magenta or light cyan, a special color ink composition such as orange, green, or violet, a clear ink composition, a metallic ink composition, etc. may be used.

In the inkjet recording method of the present invention, when two or more types of ink compositions are discharged, it is preferable for it to comprise a step of semi-curing the discharged ink composition after discharging one type of ink composition but before discharging another type of ink composition. That is, the inkjet recording method of the present invention preferably comprises, for each of the ink compositions used, a step of discharging an ink composition onto the semi-cured undercoat solution and a step of semi-curing the discharged ink composition. When in this mode, the effects of the present invention can be further exhibited.

Furthermore, when the overall curing step is carried out immediately thereafter, the inkjet recording method of the present invention may comprise a step of semi-curing the last-discharged ink composition or may not comprise it, but from the viewpoint of cost and simplicity, it is preferable for it not to comprise it.

Moreover, when two or more types of ink compositions are discharged, it is preferable to discharge any of the ink compositions onto the semi-cured undercoat solution, onto the discharged ink composition, or onto the semi-cured ink composition. That is, it is preferable to discharge any of the ink compositions onto the semi-cured undercoat solution directly or via another ink composition layer.

The inkjet recording method of the present invention may suitably employ the ink set comprising at least one ink composition of the present invention. The order in which colored ink compositions are discharged is not particularly limited, but it is preferable to apply to a recording medium from a colored ink composition having a low lightness; when the ink compositions of yellow, cyan, magenta, and black are used, they are preferably applied on top of the recording medium in the order black→magenta→cyan→yellow. Furthermore, when white is additionally used, they are preferably applied on top of the recording medium in the order black→magenta→cyan→yellow→white. Moreover, the present invention is not limited thereto, and an ink set comprising a total of seven colors, that is, light cyan, light magenta ink compositions and cyan, magenta, black, white, and yellow dark ink compositions may preferably be used, and in this case they are applied on top of the recording medium in the order black→magenta→cyan→yellow→light magenta→light cyan→white.

<Overall Curing Step>

The inkjet recording method of the present invention comprises an overall curing step of carrying out overall curing of the semi-cured undercoat solution and the ink composition by exposure under an atmosphere having an oxygen concentration of no greater than 1 vol % after the image formation, in the overall curing step exposure being carried out from both the image formation face and the reverse face of the recording medium.

The present inventors have found that, in the present invention, when overall curing is carried out by exposure, by making the atmosphere in the vicinity of the surface of the recording medium an oxygen-poor atmosphere having an oxygen concentration of no greater than 1 vol % and carrying out curing by exposure from both sides of the transparent recording medium, odor is suppressed, and adhesion, flexibility, and image quality of an image that is obtained are excellent, these being important properties for a material for flexible packaging printing, in particular a packaging printed material.

The overall curing step is a step of carrying out overall curing of the semi-cured undercoat solution and the ink composition, and it is preferable for the semi-cured undercoat solution and the ink composition to be completely cured.

Being 'completely cured' in the present invention means a state in which the interior and surface of the undercoat solution and ink composition on the recording medium are completely cured. Specifically, it can be evaluated by pressing plain paper (e.g. copier paper C2, product code V436, Fuji Xerox Co., Ltd.) with a uniform force (a constant value in the range of 500 to 1,000 $mN/cm^2$) after the overall curing step is completed, and examining transfer of the undercoat solution surface to the permeable medium. That is, when there is no transfer at all, it is defined as being in a completely cured state.

In the overall curing step, exposure is carried out in an atmosphere having an oxygen concentration of no greater than 1 vol %.

The oxygen concentration under air (1 atm) is usually 21 vol %, and reduction of the oxygen concentration to no greater than 1 vol % can be achieved by (a) reducing the pressure of the air at the time of exposure to no greater than 0.0476 atm or (b) mixing the air with a gas other than oxygen (e.g. an inert gas such as nitrogen or argon) in an amount of at least 95.4 vol % relative to the air.

The oxygen-poor atmosphere in the present invention is not particularly limited, and any of the methods above may be used.

The lower limit of the oxygen concentration is not particularly limited. It is also possible to reduce the oxygen concentration to substantially 0 by making a vacuum or exchanging the atmosphere with a gas other than air (e.g. nitrogen), and these are also preferred methods.

Furthermore, the oxygen concentration in the overall curing step is preferably 0.01 to 1 vol %, and more preferably 0.1 to 1 vol %.

As means for controlling the oxygen concentration of the curing atmosphere, for example, there are a method in which image formation equipment is formed as a closed system and the atmosphere is replaced by an atmosphere of nitrogen or an atmosphere of carbon dioxide and a method in which an inert gas such as nitrogen is made to flow. As means for supplying nitrogen, for example, there is a method in which a nitrogen cylinder is used or a device for separating only nitrogen gas from air by utilizing a difference in permeability of a hollow fiber membrane toward oxygen and nitrogen is used. As means for supplying carbon dioxide, there is a method in which a cylinder is used for supply.

The inert gas means a general gas such as $N_2$, $H_2$, or $CO_2$ or a noble gas such as He, Ne, or Ar. Among them, in terms of safety, availability, and cost, $N_2$ is suitably used.

As actinic radiation used for exposure in the overall curing step, in addition to UV, for example, visible light, α-rays, γ-rays, X rays, or an electronic beam may be used. Among them, in terms of cost and safety the actinic radiation is preferably UV or visible light, and particularly preferably UV.

The amount of energy necessary for overall curing in the overall curing step depends on the composition, in particular the type or content of photopolymerization initiator, but is preferably on the order of 100 to 10,000 $mJ/cm^2$.

As exposure equipment suitable for the overall curing step, there can be cited a metal halide lamp, a mercury lamp, and an LED light source. Among them, an LED light source is preferable, and a 365 nm LED light source is particularly preferable. In the present invention, 'a 365 nm LED light source' denotes a LED light source with a peak wavelength of 365 nm.

Furthermore, in the inkjet recording method of the present invention, it is particularly preferable for the exposure light source used in the semi-curing step to be a 385 nm LED light source and for the exposure light source used in the overall curing step to be a 365 nm LED light source. When in this mode, a printed material that gives an image having excellent adhesion, flexibility, and image quality and that has suppressed odor can be obtained.

Inkjet recording equipment that can be used in the inkjet recording method of the present invention is not particularly limited as long as it has means for making the atmosphere around the surface of a recording medium an oxygen-poor atmosphere having an oxygen concentration of no greater than 1 vol % when carrying out the overall curing and for exposing from both sides of the transparent recording medium for curing, and known inkjet recording equipment or various types of known means such as exposure means, means for making an oxygen-poor atmosphere, and discharge means may be selected freely and used.

As inkjet recording equipment that can be used in the present invention, for example, equipment comprising an ink supply system, a temperature sensor, and an actinic radiation source can be cited.

Inkjet recording equipment that can be used particularly suitably in the present invention is now explained in further detail. The inkjet recording method of the present invention is suitably carried out by the inkjet recording equipment of the present invention, which is explained below.

The inkjet recording equipment of the present invention preferably comprises transport means for transporting a transparent recording medium, application means for applying an undercoat solution onto the recording medium, semi-curing means for semi-curing the undercoat solution applied onto the recording medium, discharge means for discharging via inkjet an ink composition onto the semi-cured undercoat solution, two-side exposure means for exposing the semi-cured undercoat solution and the ink composition from both sides of the recording medium, and oxygen-poor means for making the atmosphere when exposing by the two-side curing means an oxygen-poor atmosphere having an oxygen concentration of no greater than 1 vol %.

Furthermore, the inkjet recording equipment of the present invention is preferably so-called single pass inkjet recording equipment.

FIG. 1 is a schematic drawing showing one example of the inkjet recording equipment preferably used in the present invention. A transparent recording medium 12, which is extended between an outfeed roller 24 and a wind-up roller 26 as transport means for the transparent recording medium 12, is transported in the direction of the arrow, an undercoat solution is applied thereonto by an undercoat solution application roller 14, and the undercoat solution is semi-cured by an undercoat solution semi-curing exposure light source 16. Subsequently, an ink composition of each color (K: black, Y: yellow, M: magenta, C: cyan, W: white) is discharged by a respective inkjet head 18K, 18C, 18M, 18Y, or 18W for discharging each color, and the discharged black, yellow, magenta, and cyan ink compositions are semi-cured by semi-curing exposure light sources 20K, 20C, 20M, and 20Y disposed immediately after the inkjet heads 18K, 18C, 18M, and 18Y. Finally, the semi-cured undercoat solution and the ink composition are cured overall by exposing the recording medium from both sides using nitrogen-purged exposure light source units 22a and 22b under an oxygen-poor atmosphere having an oxygen concentration of no greater than 1 vol %.

The nitrogen-purged exposure light source units 22a and 22b are preferably of a mode in which, for example, an LED light source is surrounded by an inert gas blanket and are connected to an inert gas generator via an inert gas pipe, and when the inert gas generator is started the air within the blanket is replaced by an inert gas. The inert gas may employ $N_2$, etc. as already mentioned.

(Undercoat Solution and Ink Composition)

The undercoat solution and the ink composition used in the inkjet recording method of the present invention are explained below.

The undercoat solution that can be used in the present invention comprises two or more types of polymers and/or oligomers from among polymers and oligomers having at least a structure selected from the group consisting of a polyester structure, a polyurethane structure, and a chlorinated polyolefin structure.

Furthermore, the ink composition that can be used in the present invention comprises at least 95 parts by mass of a polyfunctional ethylenically unsaturated compound relative to 100 parts by mass of the total content of ethylenically unsaturated compound contained in the ink composition, and comprises at least 5 parts by mass of a polyalkylene glycol diacrylate.

From the viewpoint of viscosity and inkjet discharge properties, the ink composition that can be used in the present invention preferably does not comprise a polymer or oligomer having at least a structure selected from the group consisting of a polyester structure, a polyurethane structure, and a chlorinated polyolefin structure.

The undercoat solution that can be used in the present invention may comprise a colorant described later, preferably comprises a white colorant or does not comprise it, and more preferably does not comprise it.

<Specific Polymer and/or Oligomer>

The undercoat solution that can be used in the present invention comprises two or more types of polymers and/or oligomers from among polymers and oligomers having at least a structure selected from the group consisting of a polyester structure, a polyurethane structure, and a chlorinated polyolefin structure (also called a 'specific polymer and/or oligomer'). They are preferably oligomers in order to maintain a suitable viscosity for the undercoat solution. In the present invention, the oligomer having the above structure is preferably an acrylate oligomer.

In the present invention, the 'acrylate oligomer' is an oligomer comprising at least one acryloyl or methacryloyl group and may be used by appropriately selecting it from known acrylate oligomers. The acrylate oligomer preferably comprises in total 1 to 12 acryloyl groups and methacryloyl groups, more preferably 1 to 6, and yet more preferably 2 to 6.

The acrylate oligomer includes not only an oligomer comprising an acryloyl group but also an oligomer comprising a methacryloyl group, and is preferably an oligomer comprising an acryloyl group.

In the present invention, the oligomer preferably has a viscosity at room temperature (25° C.) of at least 0.1 Pa·s (100 cP). Furthermore, the oligomer preferably has a weight-average molecular weight of no greater than 20,000 as an upper limit. The viscosity at room temperature may be measured by an RE80 Model viscometer manufactured by Toki Sangyo Co., Ltd.

The acrylate oligomer preferably has a weight-average molecular weight of no greater than 20,000, and more preferably no greater than 10,000. In the present invention, the weight-average molecular weight is measured by a GPC method (gel permeation chromatograph method) and determined on a reference polystyrene basis. Specifically, for example, an HLC-8220 GPC (Tosoh Corporation) is used as a GPC, with three columns of TSKgeL SuperHZM-H, TSKgeL SuperHZ4000, and TSKgeL SuperHZ2000 (Tosoh Corporation, 4.6 mm ID×15 cm) as columns, and THF (tetrahydrofuran) as eluent. The conditions are such that the sample concentration is 0.35 mass %, the flow rate is 0.35 mL/min, the amount of sample injected is 10 μL, the measurement temperature is 40° C., and an IR detector is used. Furthermore, a calibration curve is generated from eight samples of 'reference sample TSK standard, polystyrene', that is, 'F-40', 'F-20', 'F-4', 'F-1', 'A-5000', 'A-2500', 'A-1000', and 'n-propylbenzene' manufactured by Tosoh Corporation The oligomer in the acrylate oligomer may be any oligomer, and examples thereof include olefin-based (ethylene oligomer, propylene oligomer, butene oligomer, chlorinated polyolefin oligomer, etc.), vinyl-based (styrene oligomer, vinyl alcohol oligomer, vinylpyrrolidone oligomer acrylate oligomer, methacrylate oligomer, etc.), diene-based (butadiene oligomer, chloroprene rubber, pentadiene oligomer, etc.), ring-opening polymerization-based (di-, tri-, tetraethylene glycol, polyethylene glycol, polyethylimine, etc.), polyaddition-based (urethane acrylate, polyester acrylate, polyamide oligomer, polyisocyanate oligomer), and addition-condensation oligomers (phenolic resin, amino resin, xylene resin, ketone resin, etc.).

Among them, it is necessary for the acrylate oligomer to have a polyester structure, a urethane structure, or a chlorinated polyolefin structure in order to maintain good adhesion.

As the urethane acrylate, an aliphatic urethane acrylate and an aromatic urethane acrylate may preferably be cited, and an aliphatic urethane acrylate and may more preferably be cited The acrylate oligomer is a compound having preferably 1 to 4, more preferably 1 or 2, and yet more preferably 2 acryloyl groups and/or methacryloyl groups. With respect to the oligomer, 'Origomar Handobukku (Oligomer Handbook)' (edited by Junji Furukawa, The Chemical Daily Co., Ltd.) may also be referred to.

As oligomer commercial products, compounds described below may be cited.

Examples of urethane acrylates include CN991, CN2922, CN9011, and CN992 manufactured by Sartomer, R1204, R1211, R1213, R1217, R1218, R1301, R1302, R1303, R1304, R1306, R1308, R1901, and R1150 manufactured by Dai-Ichi Kogyo Seiyaku Co., Ltd., the EBECRYL series (e.g. EBECRYL 230, 270, 4858, 8402, 8804, 8807, 8803, 9260, 1290, 1290K, 5129, 4842, 8210, 210, 4827, 6700, 4450, and 220) manufactured by Daicel-Cytec Company Ltd., NK Oligo U-4HA, U-6HA, U-15HA, U-108A, and U-200AX manufactured by Shin-Nakamura Chemical Co., Ltd., and Aronix M-1100, M-1200, M-1210, M-1310, M-1600, and M-1960 manufactured by Toagosei Co., Ltd.

Examples of polyester acrylates include CN146, CN820, and CN147 manufactured by Sartomer, the EBECRYL series (e.g. EBECRYL 770, IRR467, 81, 84, 83, 80, 675, 800, 810, 812, 1657, 1810, IRR302, 450, 670, 830, 870, 1830, 1870, 2870, IRR267, 813, IRR483, 811, etc.) manufactured by Daicel-Cytec Company Ltd. and Aronix M-6100, M-6200, M-6250, M-6500, M-7100, M-8030, M-8060, M-8100, M-8530, M-8560, and M-9050 manufactured by Toagosei Co., Ltd.

In the present invention, it is necessary to use two or more types of specific polymers and/or oligomers. This is because different specific polymers and/or oligomers are effective for adhesion depending on the type of substrate, and in order to ensure adhesion for a wide variety of substrates it is necessary to use two or more types of oligomers/polymers.

The content of the specific polymer and/or oligomer in the present invention is preferably at least 50 mass % relative to the total mass of the undercoat solution, more preferably 55 to 99 mass %, and yet more preferably 60 to 97 mass %. When the content is within this range, sufficient substrate adhesion can be obtained.

Furthermore, examples of the (meth)acrylate having a chlorinated polyolefin structure include Superchlon 814HS and Superchlon 390S manufactured by Nippon Paper Industries Chemical Div.

The weight-average molecular weight of the specific polymer and oligomer is at least 1,000, preferably 1,000 to 1,000,000, more preferably 1,000 to 100,000, yet more preferably 1,000 to 50,000, and particularly preferably 2,000 to 20,000.

Furthermore, the oligomer is usually a polymer in which a limited number (usually 5 to 100) of monomers are bonded, and the weight-average molecular weight is preferably less than 20,000.

<Ethylenically Unsaturated Compound>

The ink composition that can be used in the present invention comprises an ethylenically unsaturated compound.

Furthermore, the ink composition that can be used in the present invention comprises at least 95 parts by mass of a polyfunctional ethylenically unsaturated compound relative to 100 parts by mass of the total content of ethylenically unsaturated compound contained in the ink composition, and at least 5 parts by mass of a polyalkylene glycol diacrylate.

The undercoat solution that can be used in the present invention preferably comprises an ethylenically unsaturated compound.

As the ethylenically unsaturated compound, a known ethylenic compound may be used, and examples thereof include a (meth)acrylate compound, a vinyl ether compound, an allyl compound, an N-vinyl compound, and an unsaturated carboxylic acid. There can be cited, for example, radically polymerizable monomers described in JP-A-2009-221414, polymerizable compounds described in JP-A-2009-209289, and ethylenically unsaturated compounds described in JP-A-2009-191183.

The ethylenically unsaturated compound is preferably a (meth)acrylate compound, and more preferably an acrylate compound.

The ink composition that can be used in the present invention preferably comprises a polyfunctional (meth)acrylate compound as the polyfunctional ethylenically unsaturated compound.

The polyfunctional (meth)acrylate compound is preferably a polyfunctional (meth)acrylate monomer and/or a polyfunctional (meth)acrylate oligomer, and more preferably comprises at least a difunctional (meth)acrylate compound.

Furthermore, the difunctional (meth)acrylate compound is preferably a difunctional acrylate compound, and particularly preferably comprises at least a diacrylate monomer.

Preferred examples of the polyfunctional (meth)acrylate compound include a di(meth)acrylate compound (di(meth)acrylate monomer) having 6 to 12 atoms in a main chain.

In the present invention, the monomer means a compound having a molecular weight of less than 1,000, and the oligomer means a polymer in which usually a limited number (usually 5 to 100) of monomers are bonded and has a weight-average molecular weight of at least 1,000.

Furthermore, in the present invention, the (meth)acrylate monomer means a compound comprising at least one (meth)acryloyloxy group in the molecule and having a molecular weight of less than 1,000.

In the present invention, the (meth)acrylate monomer preferably has a molecular weight of no greater than 700, more preferably no greater than 500, yet more preferably 226 to 358, and particularly preferably 242 to 300. When the molecular weight is within this range, a balance can be achieved between suppression of migration and odor of a printed material and reactivity.

Specific examples of the difunctional (meth)acrylate compound include dipropylene glycol di(meth)acrylate, tetraethylene glycol di(meth)acrylate, neopentyl glycol di(meth)acrylate, 3-methylpentanediol di(meth)acrylate, hexanediol di(meth)acrylate, heptanediol di(meth)acrylate, an ethylene oxide (EO)-modified neopentyl glycol di(meth)acrylate, a propylene oxide (PO)-modified neopentyl glycol di(meth)acrylate, a EO-modified hexanediol di(meth)acrylate, a PO-modified hexanediol di(meth)acrylate, octanediol di(meth)acrylate, nonanediol di(meth)acrylate, decanediol di(meth)acrylate, dodecanediol di(meth)acrylate, tripropylene glycol di(meth)acrylate, and triethylene glycol di(meth)acrylate.

Specific examples of the tri- or higher-functional (meth)acrylate compound include pentaerythritol tri(meth)acrylate, pentaerythritol tetra(meth)acrylate, dipentaerythritol tetra(meth)acrylate, trimethylolpropane tri(meth)acrylate, tetramethylolmethane tetra(meth)acrylate, and oligoester (meta)acrylate.

The polyfunctional ethylenically unsaturated compound in the undercoat solution and the ink composition preferably comprises a difunctional (meth)acrylate compound, more preferably a hydrocarbon diol di(meth)acrylate, yet more preferably a straight-chain or branched hydrocarbon diol di(meth)acrylate, and particularly preferably 3-methylpentanediol di(meth)acrylate and/or 1,10-decanediol di(meth)acrylate. When in this mode, a printed material that gives an image having excellent adhesion, flexibility, and image quality and that has suppressed odor can be obtained.

Furthermore, the ink composition preferably comprises a propylene oxide-modified neopentyl glycol di(meth)acrylate as the polyfunctional ethylenically unsaturated compound.

Moreover, the undercoat solution and the ink composition preferably comprise at least one identical compound as the ethylenically unsaturated compound.

Furthermore, the ink composition comprises, as the polyfunctional ethylenically unsaturated compound, at least 5 parts by mass of a polyalkylene glycol diacrylate relative to 100 parts by mass of the total content of ethylenically unsaturated compound contained in the ink composition.

The polyalkylene glycol diacrylate is preferably polyethylene glycol diacrylate or polypropylene glycol diacrylate.

Moreover, the number of alkylene glycol unit repeats, that is, alkylene oxy groups, in the polyalkylene glycol diacrylate is at least 2, preferably 2 to 100, and more preferably 5 to 20.

The content of the polyalkylene glycol diacrylate in the ink composition is at least 5 parts by mass relative to 100 parts by mass of the total content of ethylenically unsaturated compound contained in the ink composition, preferably 5 to 50 parts by mass, more preferably 5 to 30 parts by mass, and yet more preferably 5 to 20 parts by mass. When in this mode, a printed material that gives an image having excellent adhesion and flexibility and that has suppressed odor can be obtained.

The undercoat composition and the ink composition may include a monofunctional polymerizable compound. examples thereof include a monofunctional (meth)acrylate, a monofunctional (meth)acrylamide, an monofunctional aromatic vinyl compound, a monofunctional vinyl ether, and a monofunctional N-vinyl compound.

Specific examples of monofunctional (meth)acrylates include hexyl (meth)acrylate, 2-ethylhexyl (meth)acrylate, tert-octyl (meth)acrylate, isoamyl (meth)acrylate, decyl (meth)acrylate, isodecyl (meth)acrylate, stearyl (meth)acrylate, isostearyl (meth)acrylate, cyclohexyl (meth)acrylate, 4-n-butylcyclohexyl (meth)acrylate, bornyl (meth)acrylate, isobornyl (meth)acrylate, benzyl (meth)acrylate, 2-ethylhexyldiglycol (meth)acrylate, butoxyethyl (meth)acrylate, 2-chloroethyl (meth)acrylate, 4-bromobutyl (meth)acrylate, cyanoethyl (meth)acrylate, benzyl (meth)acrylate, butoxymethyl (meth)acrylate, 3-methoxybutyl (meth)acrylate, an alkoxymethyl (meth)acrylate, an alkoxyethyl (meth)acrylate, 2-(2-methoxyethoxyl)ethyl (meth)acrylate, 2-(2-butoxyethoxyl)ethyl (meth)acrylate, 2,2,2-trifluoroethyl (meth)acrylate, 1H,1H,2H,2H-perfluorodecyl (meth)acrylate, 4-butylphenyl (meth)acrylate, phenyl (meth)acrylate, 2,4,5-trimethylphenyl (meth)acrylate, 4-chlorophenyl (meth)acrylate, phenoxymethyl (meth)acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, a hydroxyalkyl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth)acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethylene oxide monomethyl ether (meth)acrylate, oligoethylene oxide monomethyl ether (meth)acrylate, polyethylene oxide (meth)acrylate, oligoethylene oxide (meth)acrylate, an oligoethylene oxide monoalkyl ether (meth)acrylate, a polyethylene oxide monoalkyl ether (meth)acrylate, dipropylene glycol (meth)acrylate, a polypropylene oxide monoalkyl ether (meth)acrylate, an oligopropylene oxide monoalkyl ether (meth)acrylate, 2-(meth)acryloyloxyethylsuccinic acid, 2-(meth)acryloyloxyhexahydrophthalic acid, 2-(meth)acryloyloxyethyl-2-hydroxypropyl phthalate, butoxydiethylene glycol (meth)acrylate, trifluoroethyl (meth)acrylate, perfluorooctylethyl (meth)acrylate, 2-hydroxy-3-phenoxypropyl (meth)acrylate, EO-modified phenol (meth)acrylate, EO-modified cresol (meth)acrylate, EO-modified nonylphenol (meth)acrylate, PO-modified nonylphenol (meth)acrylate, EO-modified 2-ethylhexyl (meth)acrylate, dicyclopentenyl (meth)acrylate, dicyclopentanyl (meth)acrylate, (3-ethyl-3-oxetanylmethyl)(meth)acrylate, and phenoxyethylene glycol (meta)acrylate.

Examples of the (meth)acrylamide include (meth)acrylamide, N-methyl (meth)acrylamide, N-ethyl (meth)acrylamide, N-propyl (meth)acrylamide, N-n-butyl (meth)acrylamide, N-t-butyl (meth)acrylamide, N-butoxymethyl (meth)acrylamide, N-isopropyl (meth)acrylamide, N-methylol (meth)acrylamide, N,N-dimethyl (meth)acrylamide, N,N-diethyl (meth)acrylamide, and (meth)acryloylmorpholine.

Specific examples of the aromatic vinyl compound include styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, methyl vinylbenzoate, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, and 4-t-butoxy styrene.

In addition to the above-mentioned examples, examples of the radically polymerizable monomer in the present invention include vinyl esters (vinyl acetate, vinyl propionate, vinyl versatate, etc.), allyl esters (allyl acetate, etc.), halogen-containing monomers (vinylidene chloride, vinyl chloride, etc.), vinyl cyanides ((meth)acrylonitrile, etc.), olefins (ethylene, propylene, etc.), and N-vinyl lactams (N-vinylcaprolactam, etc.).

Examples of the ethylenically unsaturated compound include an unsaturated carboxylic acid and a salt thereof such as itaconic acid, crotonic acid, isocrotonic acid, and maleic acid, and an anhydride having an ethylenically unsaturated group.

More specifically, commercially available or industrially known radically polymerizable or crosslinking monomers, oligomers, and polymers, such as those described in 'Kakyozai Handobukku' (Crosslinking Agent Handbook), Ed. S. Yamashita (Taiseisha, 1981); 'UV/EB Koka Handobukku (Genryo)' (UV/EB Curing Handbook (Starting Materials)) Ed. K. Kato (Kobunshi Kankoukai, 1985); 'UV/EB Koka Gijutsu no Oyo to Shijyo' (Application and Market of UV/EB Curing Technology), p. 79, Ed. RadTech (CMC, 1989); and E. Takiyama 'Poriesuteru Jushi Handobukku' (Polyester Resin Handbook), (The Nikkan Kogyo Shimbun Ltd., 1988) may be used.

With regard to the ethylenically unsaturated compound, one type may be used on its own or two or more types may be used in combination.

The content of the polyfunctional ethylenically unsaturated compound in the ink composition is at least 95 parts by mass relative to 100 parts by mass of the total content of ethylenically unsaturated compound contained in the ink composition, preferably 96 to 100 parts by mass, more preferably 98 to 100 mass %, and particularly preferably 100 parts by mass, that is, it does not comprise a monofunctional ethylenically unsaturated compound. When in this range, curability and substrate adhesion are excellent.

From the viewpoint of curability, the content of ethylenically unsaturated compound in the ink composition is preferably 50 to 95 mass % relative to the total mass of the ink composition, more preferably 60 to 95 mass %, and yet more preferably 65 to 90 mass %.

From the viewpoint of curability, the content of ethylenically unsaturated compound in the undercoat solution is preferably 1 to 80 mass % relative to the total mass of the undercoat solution, more preferably 5 to 50 mass %, and yet more preferably 10 to 40 mass %.

<Polymerization Initiator>

The undercoat composition that can be used in the present invention preferably comprises a polymerization initiator.

The ink composition that can be used in the present invention preferably comprises a polymerization initiator.

The polymerization initiator is preferably a radical polymerization initiator and is more preferably a radical photopolymerization initiator.

Examples of the radical polymerization initiator that can be used in the present invention include (a) an aromatic ketone, (b) an acylphosphine compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon-halogen bond, (m) an alkylamine compound, etc. With regard to these radical polymerization initiators, the above-mentioned compounds (a) to (m) may be used singly or in combination. Examples of the polymerization initiator include compounds described in paragraphs 0090 to 0116 of JP-A-2009-185186.

The radical polymerization initiator that can be used in the present invention is preferably used singly or in a combination of two or more types.

The polymerization initiator is preferably an acylphosphine compound, an α-hydroxyketone compound, and/or an α-aminoketone compound. Among them, an acylphosphine compound and/or an α-aminoketone compound is more preferable, and an acylphosphine compound is yet more preferable.

Preferred examples of the acylphosphine compound include bis(2,4,6-trimethylbenzoyl)phenylphosphine oxide, bis(2,6-dimethylbenzoyl)phenylphosphine oxide, bis(2,4,6-trimethylbenzoyl)-2-methoxyphenylphosphine oxide, bis(2,6-dimethylbenzoyl)-2-methoxyphenylphosphine oxide, bis(2,4,6-trimethylbenzoyl)-2,4-dimethoxyphenylphosphine oxide, bis(2,6-dimethylbenzoyl)-2,4-dimethoxyphenylphosphine oxide, bis(2,4,6-trimethylbenzoyl)-2,4-dipentyloxyphenylphosphine oxide, bis(2,6-dimethylbenzoyl)-2,4-dipentyloxyphenylphosphine oxide, bis(2,6-trimethoxybenzoyl)-2,4,4-trimethmethylpentylphenylphosphine oxide, 2,4,6-trimethylbenzoylethoxyphenylphosphine oxide, 2,6-dimethylbenzoylethoxyphenylphosphine oxide, 2,4,6-trimethylbenzoylmethoxyphenylphosphine oxide, 2,4,6-trimethylbenzoyldiphenylphosphine oxide (Lucirin TPO: manufactured by BASF), 2,6-dimethylbenzoylmethoxyphenylphosphine oxide, 2,4,6-trimethylbenzoyl(4-pentyloxyphenyl)phenylphosphine oxide, and 2,6-dimethylbenzoyl(4-pentyloxyphenyl)phenylphosphine oxide.

Among them, as the acylphosphine oxide compound, bis(2,4,6-trimethylbenzoyl)phenylphosphine oxide (Irgacure 819: manufactured by BASF) or bis(2,6-dimethoxybenzoyl)-2,4,4-trimethylpentylphenylphosphine is preferable, and bis(2,4,6-trimethylbenzoyl)phenylphosphine oxide is particularly preferable.

The polymerization initiator includes an aromatic ketone compound from the viewpoint of curability.

The aromatic ketone compound is preferably an α-hydroxyketone compound and/or an α-aminoketone compound.

As the α-hydroxyketone compound, a known α-hydroxyketone compound may be used, and examples of the α-hydroxyketone compound include 1-[4-(2-hydroxyethoxyl)phenyl]-2-hydroxy-2-methyl-1-propan-1-one, 2-hydroxy-2-methyl-1-phenylpropan-1-one, and 1-hydroxycyclohexyl phenyl ketone compound. Among them, 1-hydroxycyclohexyl phenyl ketone compound is preferable. The 1-hydroxycyclohexyl phenyl ketone compound referred to in the present invention means 1-hydroxycyclohexyl phenyl ketone and a compound obtained by substituting 1-hydroxycyclohexyl phenyl ketone with any substituent. The substituent may be selected freely from a range that enables an ability as a radical polymerization initiator to be exhibited, and specific examples thereof include an alkyl group having 1 to 4 carbons.

As the α-aminoketone compound, a known α-aminoketone compound may be used, and examples of the α-aminoketone compound include 2-methyl-1-phenyl-2-morpholinopropan-1-one, 2-methyl-1-[4-(hexyl)phenyl]-2-morpholinopropan-1-one, 2-methyl-1-(4-methylthiophenyl)-2-morpholinopropan-1-one, 2-ethyl-2-dimethylamino-1-(4-morpholinophenyl)butan-1-one, 2-benzyl-2-dimethylamino-1-(4-morpholinophenyl)butan-1-one, and 2-dimethylamino-2-[(4-methylphenyl)methyl]-1-[4-(4-morpholinyl)phenyl]-1-butanone.

Furthermore, a commercial product such as IRGACURE 907 (2-methyl-1-(4-methylthiophenyl)-2-morpholinopropan-1-one), IRGACURE 369 (2-benzyl-2-dimethylamino-1-(4-morpholinophenyl)-1-butanone), or IRGACURE 379

(2-dimethylamino-2-[(4-methylphenyl)methyl]-1-[4-(4-morpholinyl)phenyl]-1-butanone) can be cited as a preferred example.

Examples of the polymerization initiator include Lucirin TPO manufactured by BASF and SPEEDCURE 7040 manufactured by LAMBSON.

Among them, IRGACURE 907, etc. has a main absorption at 365 nm, and IRGACURE 369, IRGACURE 379, IRGACURE 819, LUCIRIN TPO, etc. have main absorptions at 365 nm and 385 nm.

A 365 nm LED is used as a final curing light source, a 385 nm LED is used as a pinning light source, and IRGACURE 907, etc and IRGACURE 369, IRGACURE 379, IRGACURE 819, LUCIRIN TPO, etc. are used in combination; during pinning exposure IRGACURE 369, IRGACURE 379, IRGACURE 819, LUCIRIN TPO, etc. release a radical, and during final curing exposure IRGACURE 907, etc., which is hardly sensitive to light at 365 nm, reacts, thus enabling a sufficient amount of radical to be released during final curing.

That is, the undercoat solution preferably comprises 2-methyl-1-(4-methylthiophenyl)-2-morpholinopropan-1-one and a compound selected from the group consisting of 2-benzyl-2-dimethylamino-1-(4-morpholinophenyl)-1-butanone, 2-(dimethylamino)-2-[(4-methylphenyl)methyl]-1-[4-(4-morpholinyl)phenyl]-1-butanone, bis(2,4,6-trimethylbenzoyl)phenylphosphine oxide, and bis(2,6-dimethoxybenzoyl)-2,4,4-trimethylpentylphenylphosphine oxide, and particularly preferably comprises 2-methyl-1-(4-methylthiophenyl)-2-morpholinopropan-1-one and bis(2,4,6-trimethylbenzoyl)phenylphosphine oxide.

The ink composition that can be used in the present invention preferably comprises at least a compound represented by Formula (1) or Formula (2) below. Due to the use of a compound represented by Formula (1) or Formula (2), an inkjet ink composition that has a low amount of components in a film leaching to the outside (migration), suppressed odor of a printed material, and has excellent curability and blocking resistance can be obtained.

Furthermore, the undercoat solution that can be used in the present invention may comprise a compound represented by Formula (1) or Formula (2) below.

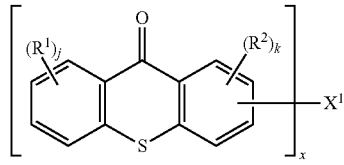

(1)

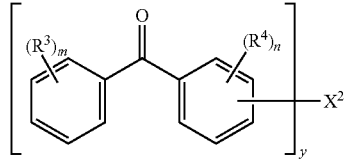

(2)

In Formula (1) and Formula (2), $R^1$ to $R^4$ independently denote an alkyl group having 1 to 5 carbons or a halogen atom, x and y independently denote an integer of 2 to 4, j and m independently denote an integer of 0 to 4, k and n independently denote an integer of 0 to 3, when j, k, m and n are integers or two or more, the plurality of $R^1$s, $R^2$s, $R^3$s, or $R^4$s may be identical to or different from each other, $X^1$ denotes an x-valent linking group comprising at least any one of a hydrocarbon chain, an ether bond, and an ester bond, and $X^2$ denotes a y-valent linking group comprising at least any one of a hydrocarbon chain, an ether bond, and an ester bond.

From the viewpoint of migration, odor, and blocking resistance, the ink composition preferably either does not comprise a polymerization initiator having a molecular weight of less than 340 or comprises a polymerization initiator having a molecular weight of less than 340 at a content of greater than 0 wt % but no greater than 1.0 mass % relative to the entire weight of the ink composition, more preferably either does not comprise them or comprises them at greater than 0 wt % but no greater than 0.05 wt %, and particularly preferably either does not comprise them or comprises them at greater than 0 wt % but no greater than 0.3 wt %.

Compound Represented by Formula (1)

The ink composition preferably comprises a compound represented by Formula (1) as the polymerization initiator.

In Formula (1), $R^1$ and $R^2$ independently denote an alkyl group having 1 to 5 carbons or a halogen atom. The alkyl group having 1 to 5 carbons may be a straight-chain, branched, or cyclic alkyl group; and is preferably a straight-chain or branched alkyl group, and the alkyl group having 1 to 5 carbons is preferably an alkyl group having 1 to 4 carbons, is more preferably an alkyl group having 2 to 3 carbons, and is yet more preferably an ethyl group or an isopropyl group.

Examples of the halogen atom include a fluorine atom, a chlorine atom, a bromine atom, and iodine atom, and the halogen atom is preferably a chlorine atom.

Among them, $R^1$ and $R^2$ are independently particularly preferably an ethyl group, an isopropyl group, or a chlorine atom.

In Formula (1), j denotes an integer of 0 to 4, is preferably an integer of 0 to 2, and is more preferably 0 or 1. When j is 2 or more, the plurality of $R^1$ each may be an identical group or different groups.

In Formula (1), k denotes an integer of 0 to 3, is preferably an integer of 0 to 2, and is more preferably 0 or 1. When k is 2 or more, the plurality of $R^2$ each may be an identical group or different groups.

In Formula (1), x denotes an integer of 2 to 4, is preferably 3 or 4, and is more preferably 4.

In Formula (1), $X^1$ denotes an x-valent linking group, which comprises at least any one of any one of a hydrocarbon chain, an ether bond, and an ester bond, consisting of an x-valent hydrocarbon chain having 2 to 300 carbons.

In the Formula (1), there are a plurality (x) of thioxanthone structures (in Formula (1), structures represented in [ ]) excluding $X^1$ which is a linking group, these may be identical or different, and are not particularly limited. From the viewpoint of synthesis, the structures are preferably the same structure.

In the compound represented by Formula (1), the substitution position on the thioxanthone structure is set to be represented as follows.

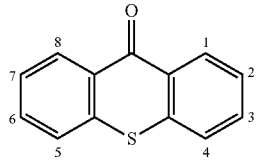 [SMILES: O=c1c2ccccc2sc2ccccc12]

When the substitution position of $X^1$ is 1- to 4-position, and the substitution position of $X^1$ is preferably 2-, 3-, or 4-position, is more preferably 2- or 4-position, and is yet more preferably 4-position.

When the substitution position of $R^1$ is 5- to 8-position, the substitution position of $R^1$ is preferably 6- or 7-position, and is more preferably 6-position.

In addition, the substitution position of $R^2$ is not limited, is preferably 1-, 2-, or 3-position, and is more preferably 1-position.

The compound represented by the Formula (1) is preferably a compound represented by Formula (1') below.

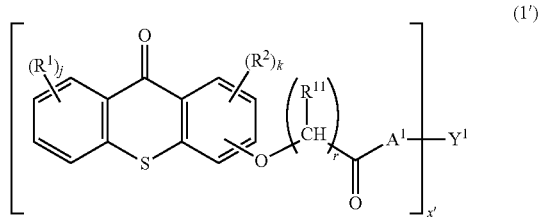

(1')

In Formula (1'), $R^1$, $R^2$, j and k have the same meanings as for $R^1$, $R^2$, j and k in Formula (1), and the preferable ranges are also the same.

In Formula (1'), $R^{11}$ independently denotes a hydrogen atom or an alkyl group having 1 to 4 carbons, and is preferably a hydrogen atom, a methyl group, or an ethyl group, and is more preferably a hydrogen atom.

In Formula (1'), r independently denotes an integer of 1 to 6, and is preferably an integer of 1 to 3, is more preferably 1 or 2, and is yet more preferably 1. In addition, when r is 2 or more, the plurality of $R^{11}$ each may be an identical group or different groups.

x' denotes an integer of 2 to 4, is preferably 2 or 3, and is more preferably 2.

$Y^1$ denotes a residue formed by removing hydrogen atoms of x' hydroxy groups from a polyhydroxy compound having at least x' hydroxy groups, and is preferably a residue formed by removing hydrogen atoms of all (x') the hydroxy groups from polyhydroxy compounds having x' hydroxy groups. Specifically, a residue formed by removing hydrogen atoms of x' hydroxy groups from a polyhydroxy compound selected from the group consisting of ethylene glycol, propylene glycol, butylene glycol, glycerin, trimethylol propane, ditrimethylolpropane, and pentaerythritol is preferable, and a residue formed by removing hydrogen atoms of all hydroxy groups is preferable.

In Formula (1'), $A^1$ denotes a group which is selected from the group consisting of Formulae (i) to (iii) below.

*—[O(CHR$^{12}$CHR$^{13}$)$_a$]$_z$—**      (i)

*—[O(CH$_2$)$_b$CO]$_z$—**      (ii)

*—[O(CH$_2$)$_b$CO]$_{(z-1)}$—[O(CHR$^{12}$CHR$^{13}$)$_a$]—**      (iii)

In Formula (i) to Formula (iii), one of $R^{12}$ and $R^{13}$ denotes a hydrogen atom, the other denotes a hydrogen atom, a methyl group, or an ethyl group, a denotes 1 or 2; b denotes 4 or 5; and z represents an integer of 1 to 20, * denotes the bonding position with the carbonyl carbon, and ** denotes the bonding position with $Y^1$.

$A^1$ is preferably a group represented by Formula (i), and is more preferably *—(OCH$_2$CH$_2$)$_z$—**, *—(OCH$_2$CH$_2$CH$_2$CH$_2$)$_z$—**, or *—O(CH(CH$_3$)CH$_2$)$_z$—**. In this case, z is more preferably an integer of 3 to 10.

The molecular weight of the compound represented by Formula (1) is preferably 500 to 3,000, more preferably 800 to 2,500, and yet more preferably 1,000 to 2,000.

When the molecular weight is 500 or more, the elution of the compound from the cured film is suppressed and it is possible to obtain an ink composition where migration, odor, and blocking are suppressed. On the other hand, when the molecular weight is 3,000 or less, the steric hindrance of the molecule is small and, in addition, the degree of freedom in the liquid/film of the molecule is maintained and a high sensitivity can be obtained.

When the compound represented by Formula (1) is a mixture of a plurality of compounds that each have different from carbon numbers and the like, the weight average molecular weight is preferably in the range described above.

Specific examples of the compound represented by Formula (1) are described below, but the present invention is not limited to the following compounds.

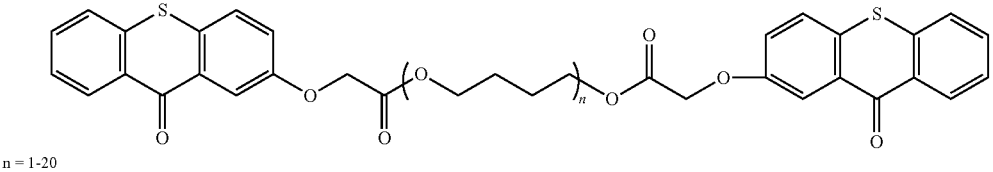

I-A n = 1-20

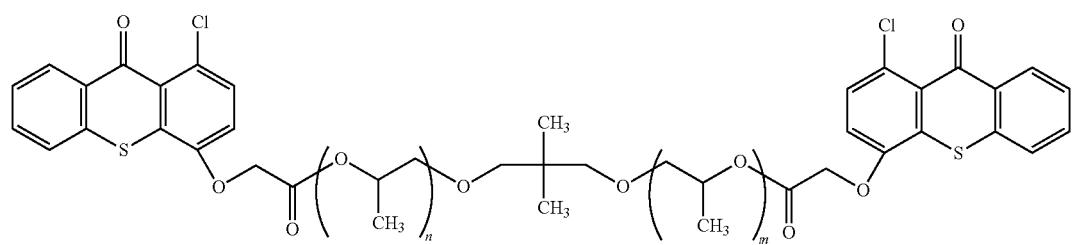

I-B n = 1-20
m = 1-20

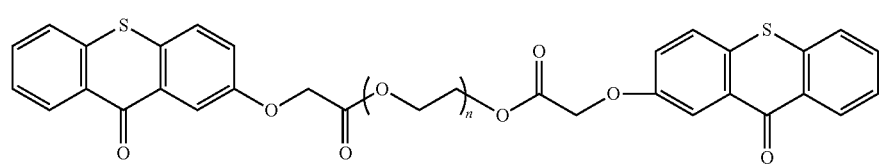

I-C n = 1-20

-continued

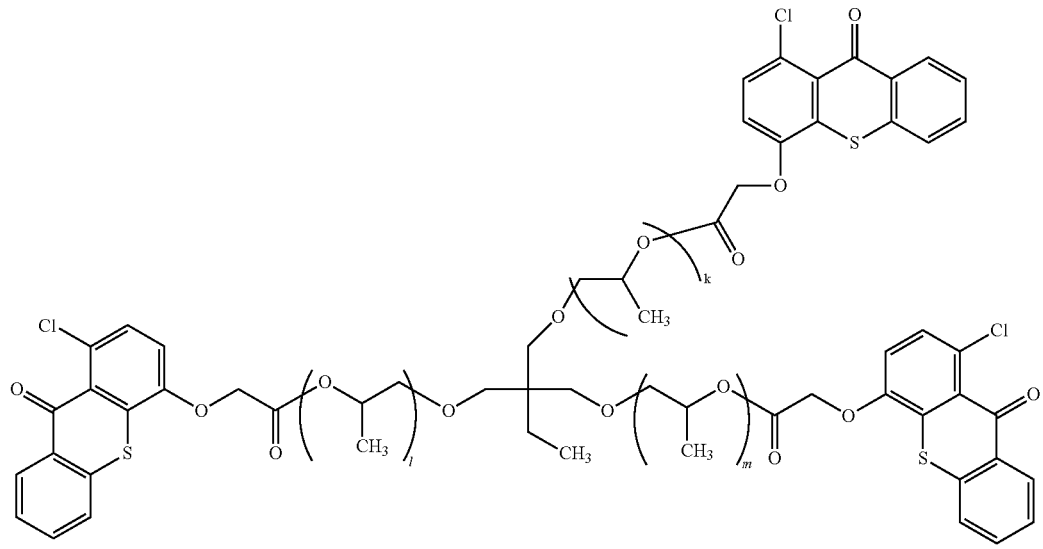

I-D k = 1-20
l = 1-20
m = 1-20

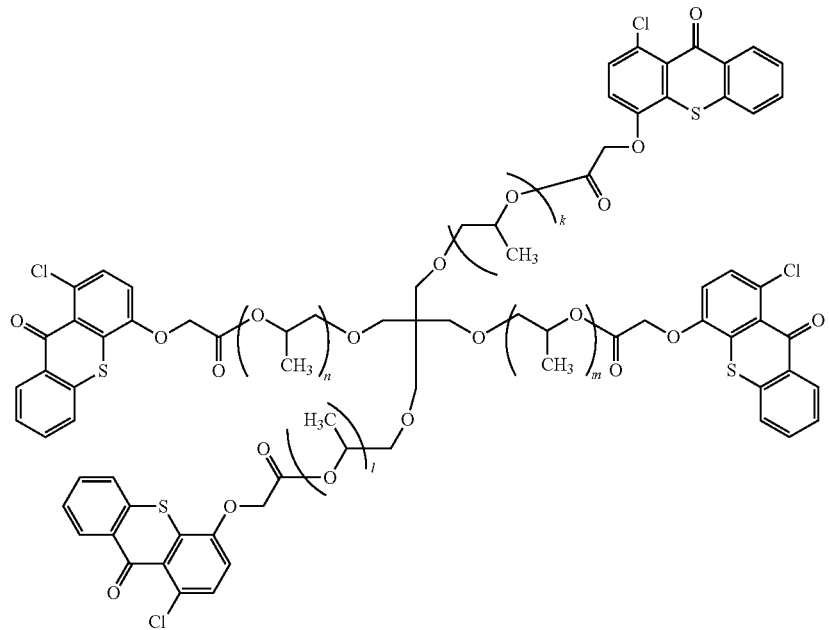

I-E k = 1-20
l = 1-20
m = 1-20
n = 1-20

Among them, the compound 1-A or 1-E is preferable, and the compound 1-E is more preferable.

As the compound represented by Formula (1), a commercial compound can be used. Specific examples include SPEEDCURE 7010 (1,3-di({α-[1-chloro-9-oxo-9H-thioxanthen-4-yl]oxy}acetylpoly[oxy(1-methylethylene)])oxy)-2,2-bis({α-[1-chloro-9-oxo-9H-thioxanthe-n-4-yl]oxy}acetylpoly[oxy(1-methylethylene)])oxymethyl)propane, CAS No 1003567-83-6, manufactured by Lambson Co., Ltd.), OMNIPOL TX (polybutylene glycol bis(9-oxo-9H-thioxanthenyloxy)acetate, CAS No. 813452-37-8, manufactured by Insight High Technology Co., Ltd.).

A method of producing the compound represented by Formula (1) can be used a known reaction, and is not particularly limited, for example, it is possible for the compound represented by Formula (1') can be produced by reacting a compound represented by Formula (1-1) below and a compound represented by Formula (1-2) below.

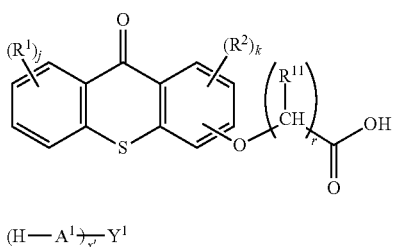

(1-1)

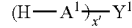

(1-2)

In Formula (1-1) and Formula (1-2), $R^1$, $R^2$, $R^{11}$, $A^1$, $Y^1$, j, k, r, and x have the same meanings as for $R^1$, $R^2$, $R^{11}$, $A^1$, $Y^1$, j, k, r, and x in Formula (1'), and the preferable ranges are also the same.

The above-described reaction is preferably performed in the presence of a solvent, and examples of suitable solvents include aromatic hydrocarbons such as benzene, toluene, and xylene.

In addition, the reaction is preferably performed in the presence of a catalyst, and examples of the catalyst include sulfonic acid (for example, p-toluene sulfonic acid, and methane sulfonic acid), inorganic acids (for example, sulfuric acid, hydrochloric acid, and phosphoric acid), Lewis acids (aluminum chloride, boron trifluoride, and organotitanates) and the like.

The reaction temperature and the reaction time are not particularly limited.

After finishing of the reaction, it is possible to separate the product by isolation from the reaction mixture using known means, washing as necessary, and performing drying.

Compound Represented by Formula (2)

The ink composition preferably comprises a compound represented by Formula (2) as a polymerization initiator.

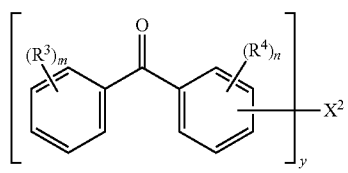

(2)

In Formula (2), $R^3$ and $R^4$ independently denote an alkyl group having 1 to 5 carbons or a halogen atom, m denotes an integer of 0 to 4, n denotes an integer of 0 to 3, y denotes an integer of 2 to 4, when m and n are integers or two or more, the plurality of $R^3$s and $R^4$s may be identical to or different from each other, and $X^2$ denotes a y-valent linking group comprising at least any one of a hydrocarbon chain, an ether bond, and an ester bond.

In Formula (2), $R^3$ and $R^4$ independently denote an alkyl group having 1 to 5 carbons or a halogen atom. The alkyl group having 1 to 5 carbons may be a straight-chain, branched, or cyclic alkyl group; and is preferably a straight-chain or branched alkyl group, and the alkyl group having 1 to 5 carbons is preferably an alkyl group having 1 to 4 carbons, is more preferably an alkyl group having 2 to 3 carbons, and is yet more preferably an ethyl group or an isopropyl group. Examples of the halogen atom include a fluorine atom, a chlorine atom, a bromine atom, and iodine atom, and the halogen atom is preferably a chlorine atom. Among them, $R^3$ and $R^4$ are independently particularly preferably an ethyl group, an isopropyl group, or a chlorine atom.

In Formula (2), m denotes an integer of 0 to 4, is preferably an integer of 0 to 2, and is more preferably 0 or 1. When m is 2 or more, the plurality of $R^3$ each may be an identical group or different groups.

In Formula (2), n denotes an integer of 0 to 3, is preferably an integer of 0 to 2, and is more preferably 0 or 1. When n is 2 or more, the plurality of $R^4$ each may be an identical group or different groups.

In Formula (2), y denotes an integer of 2 to 4, is preferably 2 or 3, and is more preferably 2.

In Formula (2), $X^2$ denotes a y-valent linking group comprising at least any one of a hydrocarbon chain, an ether bond, and an ester bond.

In the Formula (2), there are a plurality (y) of benzophenone structures (in Formula (2), structures represented in [ ]) excluding $X^2$ which is a linking group, these may be identical or different, and are not particularly limited. From the viewpoint of synthesis, the structures are preferably the same structure.

In the compound represented by Formula (2), the substitution position on the benzophenone structure is set to be represented as follows.

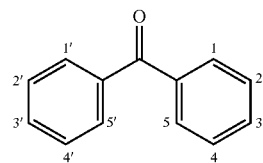 [SMILES: O=C(c1ccccc1)c1ccccc1]

When the substitution position of $X^2$ is 1- to 5-position, and the substitution position of $X^2$ is preferably 2- or 3-position, and is more preferably 3-position.

The substitution position of $R^3$ is not limited, is preferably 2'- or 3'-position, and is more preferably 3'-position.

In addition, the substitution position of $R^4$ is not limited, and is preferably 2-, 3-, or 4-position.

The compound represented by the Formula (2) is preferably a compound represented by Formula (2') below.

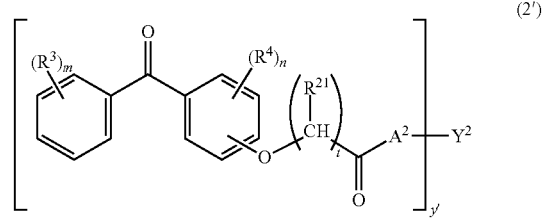

(2')

In Formula (2'), $R^3$, $R^4$, m and n have the same meanings as for $R^3$, $R^4$, m and n in Formula (2), and the preferable ranges are also the same.

In Formula (2'), $R^{21}$ independently denotes a hydrogen atom or an alkyl group having 1 to 4 carbons, and is preferably a hydrogen atom, a methyl group, or an ethyl group, and is more preferably a hydrogen atom.

In Formula (2'), t independently denotes an integer of 1 to 6, and is preferably an integer of 1 to 3, is more preferably 1 or 2, and is yet more preferably 1. In addition, when t is 2 or more, the plurality of $R^{21}$ each may be an identical group or different groups.

y' denotes an integer of 2 to 4, is preferably 2 or 3, and is more preferably 2.

$Y^2$ denotes a residue formed by removing hydrogen atoms of y' hydroxy groups from a polyhydroxy compound having at least y' hydroxy groups, and is preferably a residue formed by removing hydrogen atoms of all (y') the hydroxy groups from polyhydroxy compounds having y' hydroxy groups. Specifically, a residue formed by removing hydrogen atoms of y' hydroxy groups from a polyhydroxy compound selected from the group consisting of ethylene glycol, propylene glycol, butylene glycol, glycerin, trimethylol propane, ditrimethylolpropane, and pentaerythritol is preferable, and a residue formed by removing hydrogen atoms of all hydroxy groups is preferable.

In Formula (2'), $A^2$ denotes a group which is selected from the group consisting of Formulae (i) to (iii) below.

*—[O(CHR$^{12}$CHR$^{13}$)$_a$]$_z$—** (i)

*—[O(CH$_2$)$_b$CO]$_z$—** (ii)

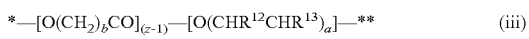

*—[O(CH$_2$)$_b$CO]$_{(z-1)}$—[O(CHR$^{12}$CHR$^{13}$)$_a$]—** (iii)

In Formula (i) to Formula (iii), one of $R^{12}$ and $R^{13}$ denotes a hydrogen atom, the other denotes a hydrogen atom, a methyl group, or an ethyl group, a denotes 1 or 2; b denotes 4 or 5; and z represents an integer of 1 to 20, * denotes the bonding position with the carbonyl carbon, and ** denotes the bonding position with $Y^1$.

$A^2$ is preferably a group represented by Formula (i), and is more preferably *—(OCH$_2$CH$_2$)$_z$—**, *—(OCH$_2$CH$_2$CH$_2$CH$_2$)$_z$—**, or *—O(CH(CH$_3$)CH$_2$)$_z$—**. In this case, z is more preferably an integer of 3 to 10.

The molecular weight of the compound represented by Formula (2) is preferably 500 to 3,000, more preferably 800 to 2,500, and yet more preferably 1,000 to 2,000.

When the molecular weight is 500 or more, the elution of the compound from the cured film is suppressed and it is possible to obtain an ink composition where migration, odor, and blocking are suppressed. On the other hand, when the molecular weight is 3,000 or less, the steric hindrance of the molecule is small and, in addition, the degree of freedom in the liquid/film of the molecule is maintained and a high sensitivity can be obtained.

When the compound represented by Formula (2) is a mixture of a plurality of compounds that each have different from carbon numbers and the like, the weight average molecular weight is preferably in the range described above.

Specific examples of the compound represented by Formula (2) are described below, but the present invention is not limited to the following compounds.

I-F

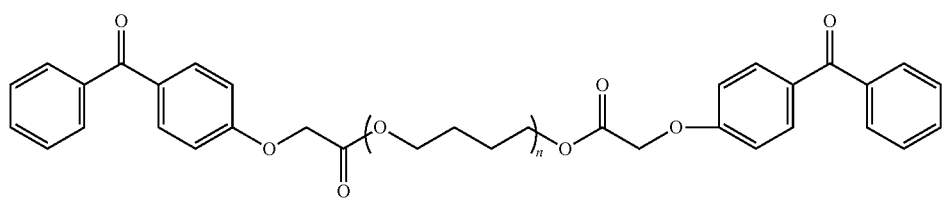

n = 1-20

I-G

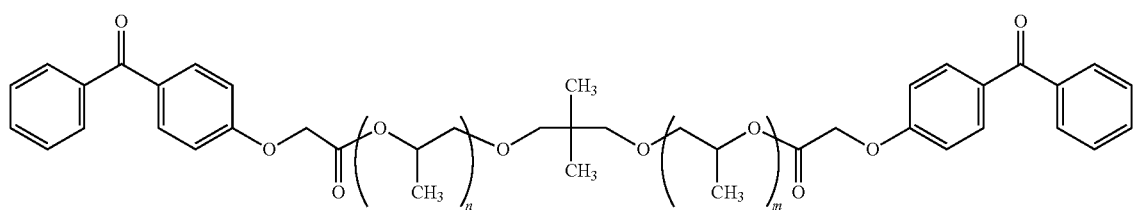

n = 1-20
m = 1-20

I-H

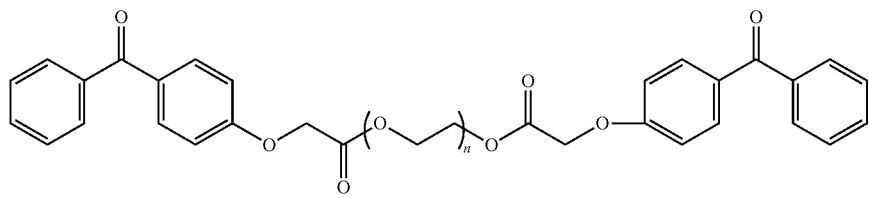

n = 1-20

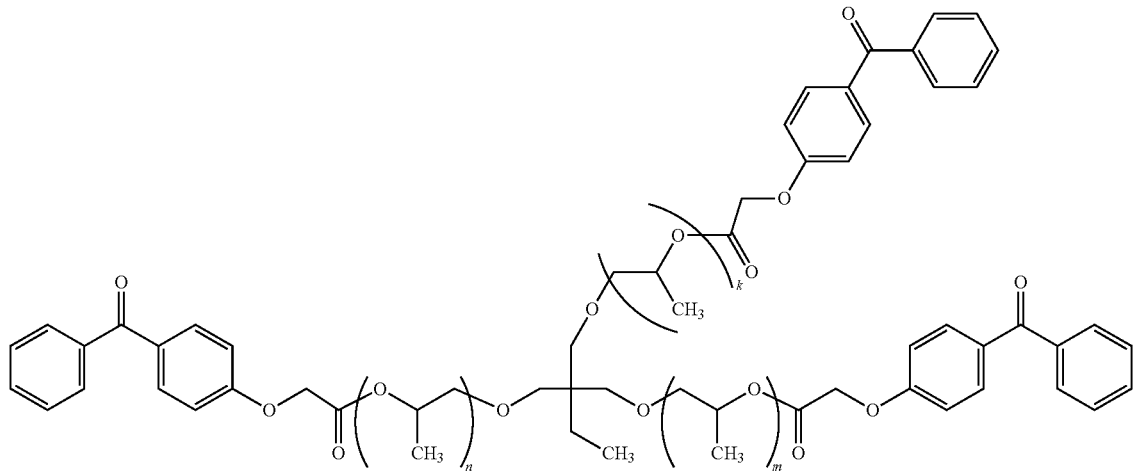

k = 1-20
l = 1-20
m = 1-20

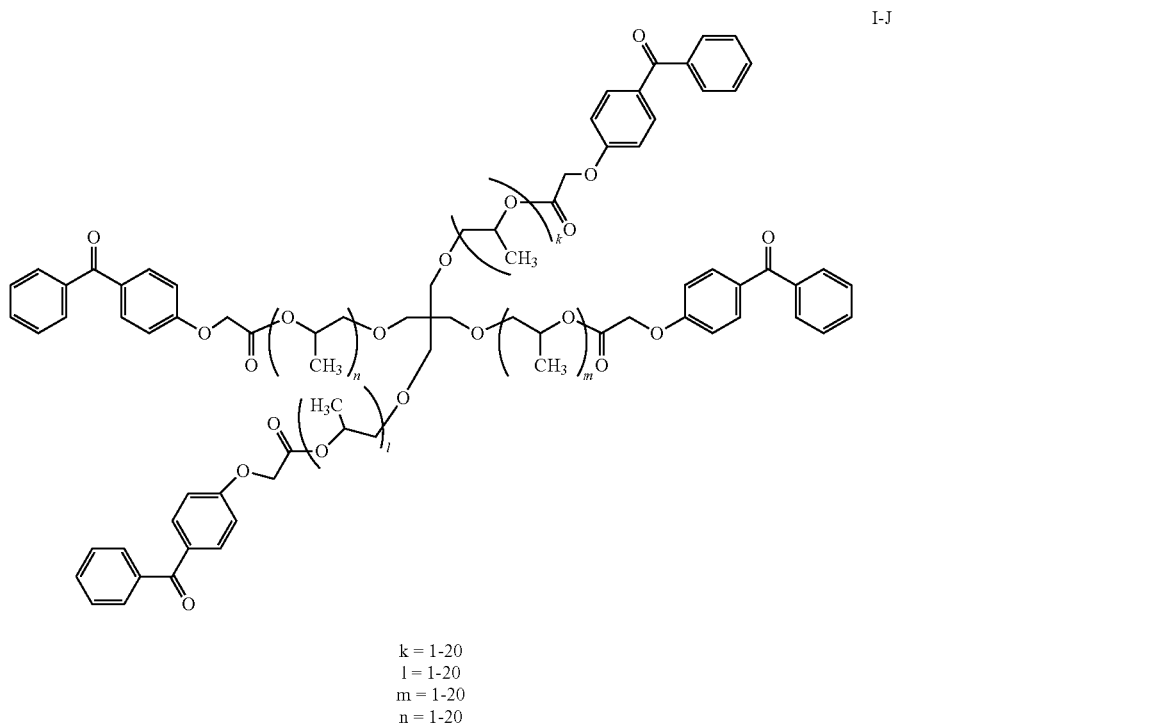

k = 1-20
l = 1-20
m = 1-20
n = 1-20

As the compound represented by Formula (2), a commercial compound can be used. Specific examples include OMNIPOL BP (polybutyleneglycol bis(4-benzoylphenoxy) acetate, CAS No. 515136-48-8, manufactured by Insight High Technology Co., Ltd.).

A method of producing the compound represented by Formula (2) can be used a known reaction, and is not particularly limited, for example, it is possible for the compound represented by Formula (2') can be produced by reacting a compound represented by Formula (2-1) below and a compound represented by Formula (2-2) below.

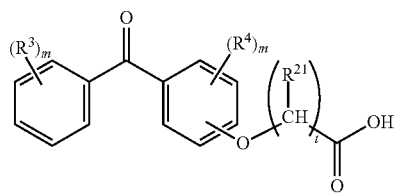

(2-1)

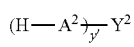

(2-2)

In Formula (2-1) and Formula (2-2), $R^3$, $R^4$, $R^{21}$, $A^2$, $Y^2$, m, n, t, and y have the same meanings as for $R^3$, $R^4$, $R^{21}$, $A^2$, $Y^2$, m, n, t, and y in Formula (2'), and the preferable ranges are also the same.

The above-described reaction is preferably performed in the presence of a solvent, and examples of suitable solvents include aromatic hydrocarbons such as benzene, toluene, and xylene.

In addition, the reaction is preferably performed in the presence of a catalyst, and examples of the catalyst include sulfonic acid (for example, p-toluene sulfonic acid, and methane sulfonic acid), inorganic acids (for example, sulfuric acid, hydrochloric acid, and phosphoric acid), Lewis acids (aluminum chloride, boron trifluoride, and organotitanates) and the like.

The reaction temperature and the reaction time are not particularly limited.

After finishing of the reaction, it is possible to separate the product by isolation from the reaction mixture using known means, washing as necessary, and performing drying.

From the point of view of increasing sensitivity and suppressing migration, odor, and blocking, the total content of the compound represented by Formula (2) is preferably 1 to 5 mass % of the entire ink composition, and more preferably 2 to 4 mass %.

The total content of the compound represented by Formula (1) and the compound represented by Formula (2) is preferably 0.01 to 10 mass % of the entire ink composition, more preferably 0.05 to 8.0 mass %, yet more preferably 0.1 to 5.0 mass %, and particularly preferably 0.1 to 2.4 mass %.

The undercoat composition and the ink composition preferably comprise, as a polymerization initiator, a compound which functions as a sensitizer (hereinafter also calls 'sensitizer') in order to promote decomposition of the photopolymerization initiator by absorbing specific actinic radiation.

Examples of the sensitizer include polynuclear aromatic compounds (e.g. pyrene, perylene, triphenylene, 2-ethyl-9,10-dimethoxy anthracene), xanthenes (e.g. fluorescein, eosin, erythrosine, rhodamine B, rose bengal), cyanines (e.g. thiacarbocyanine, oxacarbocyanine), merocyanines (e.g. merocyanine, carbomerocyanine), thiazines (e.g. thionine, methylene blue, toluidine blue), acridines (e.g. acridine orange, chloroflavin, acriflavine), anthraquinones (e.g. anthraquinone), squaryliums (e.g. squarylium), and coumarins (e.g. 7-diethylamino-4-methylcoumarin), thioxanthones (e.g. isopropylthioxanthone), and thiochromanones (e.g. thiochromanone).

Among them, as a sensitizer, a thioxanthones is preferable, and isopropylthioxanthone is more preferable.

The sensitizer may be used singly or in a combination of two or more compounds.

In the ink composition, the total content of the polymerization initiator is preferably 1.0 to 15.0 mass % relative to the mass of the entire ink composition, more preferably 1.5 to 10.0 mass %, and yet more preferably 3.0 to 8.0 mass %. When in the above-mentioned range, the ink composition having excellent curability is obtained.

<Colorant>

The ink composition that can be used in the present invention may preferably comprise a colorant in order to improve the visibility of a formed image area.

The undercoat composition that can be used in the present invention may comprise a colorant, and, as above-mentioned, preferably either comprises a white colorant or does not comprise a colorant, and more preferably does not comprise a colorant.

The colorant is not particularly limited, but a pigment and an oil-soluble dye that have excellent weather resistance and rich color reproduction are preferable, and it may be selected from any known coloring agent such as a soluble dye. It is preferable that the colorant does not function as a polymerization inhibitor in a polymerization reaction, which is a curing reaction. This is because the sensitivity of the curing reaction by actinic radiation should not be degraded.

The pigment that can be used in the present invention is not particularly limited and, for example, organic and inorganic pigments having the numbers below described in the Color Index may be used.

That is, as a red or magenta pigment, Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36; as a blue or cyan pigment, Pigment Blue 1, 15, 15:1, 15:2, 15:3, 15:4, 15:6, 16, 17-1, 22, 27, 28, 29, 36, or 60; as a green pigment, Pigment Green 7, 26, 36, or 50; as a yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, or 193; as a black pigment, Pigment Black 7, 28, or 26; as a white pigment, Pigment White 6, 18, or 21, etc. may be used according to the intended application.

In the present invention, a disperse dye may be used in a range that enables it to be dissolved in a water-immiscible organic solvent. Disperse dyes generally include water-soluble dyes, but in the present invention it is preferable for the disperse dye to be used in a range such that it dissolves in a water-immiscible organic solvent.

Specific preferred examples of the disperse dye include CI Disperse Yellow 5, 42, 54, 64, 79, 82, 83, 93, 99, 100, 119, 122, 124, 126, 160, 184:1, 186, 198, 199, 201, 204, 224, and 237; CI Disperse Orange 13, 29, 31:1, 33, 49, 54, 55, 66, 73, 118, 119, and 163; CI Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; CI Disperse Violet 33; CI Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and CI Disperse Green 6:1 and 9.

It is preferable that the colorant is added to the ink composition and then dispersed in the ink to an appropriate degree. For dispersion of the colorant, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

The colorant may be added directly to the ink composition, but in order to improve dispersibility it may be added in advance to a solvent or a dispersing medium such as a polymerizable compound used in the present invention.

In the present invention, in order to avoid the problem of the solvent resistance being degraded when the solvent remains in the cured image and the VOC (Volatile Organic Compound) problem of the residual solvent, it is preferable to add the colorant in advance to a dispersing medium such as a polymerizable compound. As a polymerizable compound used, it is preferable in terms of dispersion suitability to select a monomer having low viscosity. The colorants may be used by appropriately selecting one type or two or more types according to the intended purpose of the ink composition.

When a colorant such as a pigment that is present as a solid in the ink composition is used, it is preferable for the colorant, the dispersant, the dispersing medium, dispersion conditions, and filtration conditions to be set so that the average particle size of colorant particles is preferably 0.005 to 0.5 μm, more preferably 0.01 to 0.45 μm, and yet more preferably 0.015 to 0.4 μm. By such control of particle size, clogging of a head nozzle can be suppressed, and the ink storage stability, the transparency, and the curing sensitivity can be maintained.

The content of the colorant in the ink composition is appropriately selected according to the color and the intended purpose, and is preferably 0.01 to 30 mass % relative to the mass of the entire ink composition.

The content of the colorant in the undercoat composition is appropriately selected according to the color and the intended purpose, and is preferably 0.01 to 30 mass % relative to the mass of the entire undercoat composition.

<Dispersant>

The ink composition that can be used in the present invention preferably comprises a dispersant. Especially, when the pigment is used, the ink composition preferably comprises a dispersant in order to stably disperse the pigment in the ink composition.

The undercoat composition that can be used in the present invention may comprise a dispersant.

As the dispersant, a polymeric dispersant is preferable. The 'polymeric dispersant' referred to in the present invention means a dispersant having a weight-average molecular weight of 1,000 or greater.

Examples of the polymeric dispersant include polymeric dispersants such as DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie), EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (manufactured by EFKA Additives), Disperse Aid 6, Disperse Aid 8, Disperse Aid 15, and Disperse Aid 9100 (manufactured by San Nopco Limited); various types of SOLSPERSE dispersants such as Solsperse 3000, 5000, 9000, 12000, 13240, 13940, 17000, 22000, 24000, 26000, 28000, 32000, 36000, 39000, 41000, and 71000 (manufactured by Noveon); Adeka Pluronic L31, F38, L42, L44, L61, L64, F68, L72, P95, F77, P84, F87, P94, L101, P103, F108, L121, and P-123 (manufactured by Adeka Corporation), Ionet S-20 (manufactured by Sanyo Chemical Industries, Ltd.), and Disparlon KS-860, 873SN, and 874 (polymeric dispersant), #2150 (aliphatic poly carboxylic acid), and #7004 (polyether ester type) (manufactured by Kusumoto Chemicals, Ltd.).

The content of the dispersant in the undercoat composition or the ink composition is appropriately selected according to the intended purpose, and is preferably 0.05 to 15 mass % relative to the mass of the entire undercoat composition or the entire ink composition.

<Surfactant>

The undercoat composition or the ink composition of the present invention may comprise a surfactant in order to provide stable discharge properties for a long period of time.

As the surfactant, those described in JP-A-62-173463 and JP-A-62-183457 can be cited. Examples thereof include anionic surfactants such as dialkylsulfosuccinic acid salts, alkylnaphthalene sulfonic acid salts, and fatty acid salts; nonionic surfactants such as polyoxyethylene alkyl ethers, polyoxyethylene alkyl aryl ethers, acetylene glycols, polyoxyethylene/polyoxypropylene block copolymers, and silicone oil; and cationic surfactants such as alkylamine salts and quaternary ammonium salts. An organofluoro compound may be used instead of the above-mentioned surfactant. The organofluoro compound is preferably hydrophobic. Examples of the organofluoro compound include fluorine-based surfactants, oil-like fluorine-based compounds (e.g. fluorine oil), solid fluorine compound resins (e.g. tetrafluoroethylene resin), and those described in JP-B-57-9053 (paragraphs 8 to 17) and JP-A-62-135826.

The polysiloxane compound is preferably a modified polysiloxane compound where an organic group is introduced into a part of a methyl group of dimethyl polysiloxane. Examples of the modification include polyether modification, methyl styrene modification, alcohol modification, alkyl modification, aralkyl modification, fatty acid ester modification, epoxy modification, amine modification, amino modification, mercapto modification, and the like, but the modification is not particularly limited to the above. The methods of modification may be used in combination. Among them, the polyether-modified polysiloxane compounds are preferable from the viewpoint of improving inkjet discharge stability.

Examples of the polyether-modified polysiloxane compound include SILWET L-7604, SILWET L-7607N, SILWET FZ-2104, SILWET FZ-2161 (manufactured by Nippon Unicar Co., Ltd.), BYK306, BYK307, BYK331, BYK333, BYK347, BYK348, and the like (manufactured by BYK Chemie Co., Ltd.), KF-351A, KF-352A, KF-353, KF-354L, KF-355A, KF-615A, KF-945, KF-640, KF-642, KF-643, KF-6020, X-22-6191, X-22-4515, KF-6011, KF-6012, KF-6015, and KF-6017 (manufactured by Shin-Etsu Chemical Co., Ltd.).

Among them, as the surfactant, a silicone-type surfactant is preferable.

The content of the surfactant in the undercoat composition or the ink composition of the present invention is appropriately adjusted according to the intended application, and is preferably 0.0001 to 5 mass % relative to the entire mass of the undercoat composition or the ink composition, and more preferably 0.001 to 2 mass %.

<Other Components>

The undercoat composition or the ink composition that can be used in the present invention may comprise as necessary, in addition to the above-mentioned components, a co-sensitizer, a UV absorber, an antioxidant, an antifading agent, a conductive salt, a solvent, a polymer compound, a basic compound, etc. They are described in JP-A-2009-221416 and may be used as well.

Furthermore, from the viewpoint of storage properties and suppression of head clogging, the undercoat composition or the ink composition preferably comprises a polymerization inhibitor.

The polymerization inhibitor is preferably added at 200 to 20,000 ppm relative to the total amount of the undercoat composition or the ink composition.

Examples of the polymerization inhibitor include a nitroso-based polymerization inhibitor, a hindered amine-based polymerization inhibitor, hydroquinone, benzoquinone, p-methoxyphenol, TEMPO, TEMPOL, and Al cupferron.

<Properties of Undercoat Composition and Ink Composition>

In the present invention, the ink composition has a viscosity at 25° C. of preferably no more than 40 mPa·s, more preferably 5 to 40 mPa·s, and yet more preferably 7 to 30 mPa·s. Furthermore, the viscosity of the ink composition at the discharge temperature (preferably 25° C. to 80° C., and more preferably 25° C. to 50° C.) is preferably 3 to 15 mPa·s, and more preferably 3 to 13 mPa·s. With regard to the ink composition of the present invention, it is preferable that its component ratio is appropriately adjusted so that the viscosity is in the above-mentioned range. When the viscosity at room temperature (25° C.) is set to be high, even when a porous recording medium (support) is used, penetration of the ink composition into the recording medium can be prevented, and uncured monomer can be reduced. Furthermore, ink spreading when droplets of ink composition have landed can be suppressed, and as a result there is the advantage that the image quality is improved.

The surface tension of the ink composition of the present invention at 25° C. is preferably 20 to 40 mN/m, more preferably 20.5 to 35.0 mN/m, yet more preferably 21 to 30.0 mN/m, and particularly preferable 21.5 to 28.0 mN/m. When in the above range, a printed material having excellent blocking resistance is obtained.

As a method for measuring surface tension at 25° C. of the ink composition, a known method may be used, but it is preferable to carry out measurement by a suspended ring method or the Wilhelmy method. Preferred examples include a method using a CBVP-Z automated surface tensiometer manufactured by Kyowa Interface Science Co., Ltd. and a method using a SIGMA 702 manufactured by KSV INSTRUMENTS LTD.

The viscosity of the undercoat solution is, from the viewpoint of application suitability, preferably at least 200 mPa·s but no greater than 2,000 mPa·s, and more preferably at least 300 mPa·s but no greater than 1,500 mPa·s.

The surface tension of the undercoat solution is preferably no greater than the surface tension of the ink composition and more preferably satisfies all of requirements (A), (B), and (C).

(A) The surface tension of the undercoat solution is less than the surface tension of any ink composition.

(B) Of surfactants contained in the undercoat solution, at least one type satisfies the relationship $\gamma s(0) - \gamma s(\text{saturated}) > 0$ (mN/m).

(C) The surface tension of the undercoat solution satisfies the relationship $\gamma s < (\gamma s(0) + \gamma s(\text{saturated})^{max})/2$.

Here, $\gamma s$ is the value for the surface tension of the undercoat solution. $\gamma s(0)$ is the value for the surface tension of a liquid formed by removing all surfactants from the composition of the undercoat solution. $\gamma s(\text{saturated})$ is the value for the surface tension of a liquid when the surface tension is saturated by adding one type of surfactant contained in the undercoat solution to the 'liquid formed by removing all surfactants' so as to increase the concentration of the surfactant. $\gamma s(\text{saturated})^{max}$ is the maximum value among $\gamma s(\text{saturated})$ values determined for all the surfactants satisfying requirement (B) among the surfactants contained in the undercoat solution.

It is preferable for requirement (A) to be satisfied by all ink compositions.

In the present invention, in order to form an ink dot having a desired size on a recording medium as described above, the surface tension $\gamma s$ of the undercoat solution is preferably smaller than the surface tension $\gamma k$ of any ink.

Furthermore, from the viewpoint of preventing effectively spreading of an ink dot from firing to exposure, it is more preferable that $\gamma s < \gamma k - 3$ (mN/m), and particularly preferable that $\gamma s < \gamma k - 5$ (mN/m).

In accordance with the present invention, there can be provided an inkjet recording method that can give a printed material having good image adhesion, excellent flexibility and image quality, and suppressed odor even when polypropylene, polyethylene terephthalate, or nylon is used as a recording medium, and a printed material.

EXAMPLES

The present invention is explained below more specifically by way of Examples and Comparative Examples. However, the present invention should not be construed as being limited by these Examples.

'Parts' below means 'parts by mass' unless otherwise specified.

The materials used in the present invention are as follows.
<Colorants>
IRGALITE BLUE GLVO (cyan pigment, BASF Japan)
CINQUASIA MAGENTA RT-355-D (magenta pigment, BASF Japan)
NOVOPERM YELLOW H2G (yellow pigment, Clariant)
SPECIAL BLACK 250 (black pigment, BASF Japan)
TIPAQUE CR60-2 (white pigment, Ishihara Sangyo Kaisha Ltd.)
<Dispersant>
SOLSPERSE 32000 (Noveon dispersant)
<Polymerizable Compounds>
SR9003 (PO-modified neopentyl glycol diacrylate, Sartomer)
3-Methyl-1,5-pentanediol diacrylate (SR341, Sartomer)
1,10-Decanediol diacrylate (CD595, Sartomer)
PEGDA (polyethylene glycol diacrylate, SR344, Sartomer)
PPGDA (polypropylene glycol diacrylate, Wako Pure Chemical Industries, Ltd.)
<Polymerization Initiators>
IRGACURE 819 (bis(2,4,6-trimethylbenzoyl)phenylphosphine oxide, BASF, molecular weight 419)
IRGACURE 379 (2-dimethylamino-2-(4-methyl benzyl)-1-(4-morpholin-4-yl-phenyl)butan-1-one, BASF, molecular weight 380)
IRGACURE 907 (2-methyl-1-(4-methylthiophenyl)-2-morpholinopropan-1-one, BASF, molecular weight 297)
Speedcure 7010 (Compound I-B above, Lambson, molecular weight 1,899)
<Polymers or Oligomers>
CN147 (polyester acrylate, Sartomer)
CN820 (acrylic polymer, Sartomer)
CN146 (polyester acrylate, Sartomer)
CN991 (urethane acrylate oligomer, Sartomer)
<Polymerization Inhibitor>
UV-12 (FLORSTAB UV12, nitroso-based polymerization inhibitor, tris(N-nitroso-N-phenylhydroxylamine) aluminum salt, Kromachem)
<Surfactant>
BYK-307 (silicone-based surfactant, BYK Chemie)
(Preparation of Mill Bases)
<Preparation of Cyan Mill Base A>

300 parts by mass of IRGALITE BLUE GLVO, 620 parts by mass of SR9003, and 80 parts by mass of SOLSPERSE 32000 were mixed by stirring, thus giving cyan mill base A. Preparation of cyan mill base A was carried out by dispersing using a Motor Mill M50 disperser (Eiger Machinery, Inc.) with zirconia beads having a diameter of 0.65 mm at a peripheral speed of 9 m/s for 4 hours.

<Preparation of Magenta Mill Base B, Yellow Mill Base C, Black Mill Base D, and White Mill Base E>

Magenta mill base B, yellow mill base C, black mill base D, and white mill base E were prepared in the same manner as for cyan mill base A using the formulations and dispersion conditions shown in Table 1.

TABLE 1

|  |  | Cyan mill base A | Magenta mill base B | Yellow mill base C | Black mill base D | White mill base E |
|---|---|---|---|---|---|---|
| Formulation (parts) | IRGALITE BLUE GLVO | 300 | — | — | — | — |
|  | CINQUASIA MAGENTA RT-355-D | — | 300 | — | — | — |
|  | NOVOPERM YELLOW H2G | — | — | 300 | — | — |
|  | SPECIAL BLACK 250 | — | — | — | 400 | — |
|  | TIPAQUE CR60-2 | — | — | — | — | 500 |
|  | SR9003 | 620 | 600 | 600 | 520 | 440 |
|  | SOLSPERSE 32000 | 80 | 100 | 100 | 80 | 60 |
| Dispersion conditions | Peripheral speed (m/s) | 9 | 9 | 9 | 9 | 9 |
|  | Time (hr) | 4 | 10 | 10 | 7 | 4 |

<Preparation of Cyan Ink C-1, Magenta Ink M-1, Yellow Ink Y-1, Black Ink K-1, White Ink W-1, and Undercoat Solution U-1>

Cyan ink C-1, magenta ink M-1, yellow ink Y-1, black ink K-1, white ink W-1, and undercoat solution U-1 were prepared by stirring and mixing materials at the proportions shown in Table 2 using a mixer (Silverson L4R) at room temperature (25° C.) at 5,000 rpm for 20 minutes. The units for the content of each component in Table 2 are parts by mass.

TABLE 2

|  | Cyan ink C-1 | Magenta ink M-1 | Yellow ink Y-1 | Black ink K-1 | White ink W-1 | Undercoat solution U-1 |
|---|---|---|---|---|---|---|
| 3-Methylpentanediol diacrylate | 54.1 | 47.6 | 53.1 | 57.6 | 33.6 | 62.7 |
| 1,10-Decanediol diacrylate | 30 | 30 | 30 | 30 | 30 | 30 |
| IRUGACURE 819 | 4 | 4 | 4 | 4 | 4 | 6 |
| Speedcure 7010 | 2 | 2 | 2 | 2 | 2 | — |
| Cyan mill base A | 9.5 | — | — | — | — | — |
| Magenta mill base B | — | 16 | — | — | — | — |
| Yellow mill base C | — | — | 10.5 | — | — | — |
| Black mill base D | — | — | — | 6 | — | — |
| White mill base E | — | — | — | — | 30 | — |
| UV-12 | 0.26 | 0.26 | 0.26 | 0.26 | 0.26 | 0.26 |
| BYK-307 | 0.1 | 0.1 | 0.1 | 0.1 | 0.1 | 1 |
| Sum total (parts by mass) | 100 | 100 | 100 | 100 | 100 | 100 |

<Preparation of Cyan Ink C-2, Magenta Ink M-2, Yellow Ink Y-2, Black Ink K-2, and White Ink W-2>

Cyan ink C-2, magenta ink M-2, yellow ink Y-2, black ink K-2, and white ink W-2 were prepared in the same manner as for the preparation of cyan ink C-1, magenta ink M-1, yellow ink Y-1, black ink K-1, and white ink W-1 except that 1,10-decanediol diacrylate for cyan ink C-1, magenta ink M-1, yellow ink Y-1, black ink K-1, and white ink W-1 was replaced by 10 parts by mass of PEGDA (polyethylene glycol diacrylate) and 20 parts by mass of 3-methylpentanediol diacrylate.

<Preparation of Cyan Ink C-3, Magenta Ink M-3, Yellow Ink Y-3, Black Ink K-3 and White Ink W-3>

Cyan ink C-3, magenta ink M-3, yellow ink Y-3, black ink K-3, and white ink W-3 were prepared in the same manner as for the preparation of cyan ink C-1, magenta ink M-1, yellow ink Y-1, black ink K-1, and white ink W-1 except that 1,10-decanediol diacrylate for cyan ink C-1, magenta ink M-1, yellow ink Y-1, black ink K-1, and white ink W-1 was replaced by 10 parts by mass of PPGDA (polypropylene glycol diacrylate) and 20 parts by mass of 3-methylpentanediol diacrylate.

<Preparation of Cyan Ink C-4, Magenta Ink M-4, Yellow Ink Y-4, Black Ink K-4, and White Ink W-4>

Cyan ink C-4, magenta ink M-4, yellow ink Y-4, black ink K-4, and white ink W-4 were prepared in the same manner as for the preparation of cyan ink C-1, magenta ink M-1, yellow ink Y-1, black ink K-1, and white ink W-1 except that 1,10-decanediol diacrylate for cyan ink C-1, magenta ink M-1, yellow ink Y-1, black ink K-1, and white ink W-1 was replaced by phenoxyethyl acrylate.

<Preparation of Undercoat Solution U-2>

Undercoat solution U-2 was prepared in the same manner as for the preparation of undercoat solution U-1 except that 1,10-decanediol diacrylate for undercoat solution U-1 was replaced by CN147.

<Preparation of Undercoat Solution U-3>

Undercoat solution U-3 was prepared in the same manner as for the preparation of undercoat solution U-1 except that 1,10-decanediol diacrylate for undercoat solution U-1 was replaced by CN820.

<Preparation of Undercoat Solution U-4>

Undercoat solution U-4 was prepared in the same manner as for the preparation of undercoat solution U-1 except that 1,10-decanediol diacrylate for undercoat solution U-1 was replaced by CN147 and 30 parts by mass of 3-methylpentanediol diacrylate was replaced by CN820.

<Preparation of Undercoat Solution U-5>

Undercoat solution U-5 was prepared in the same manner as for the preparation of undercoat solution U-1 except that 1,10-decanediol diacrylate for undercoat solution U-1 was replaced by CN146 and 30 parts by mass of 3-methylpentanediol diacrylate was replaced by CN991.

<Preparation of Undercoat Solution U-6>

Undercoat solution U-6 was prepared in the same manner as for the preparation of undercoat solution U-1 except that 1,10-decanediol diacrylate for undercoat solution U-1 was replaced by CN147, 30 parts by mass of 3-methylpentanediol diacrylate was replaced by CN820, and 4 parts by mass of IRGACURE 819 was replaced by IRGACURE 907.

<Preparation of Undercoat Solution U-7>

Undercoat solution U-7 was prepared in the same manner as for the preparation of undercoat solution U-1 except that 1,10-decanediol diacrylate for undercoat solution U-1 was replaced by CN146, 30 parts by mass of 3-methylpentanediol diacrylate was replaced by CN991, and 4 parts by mass of IRGACURE 819 was replaced by IRGACURE 907.

<Image Formation Method 1>

Figure 2:
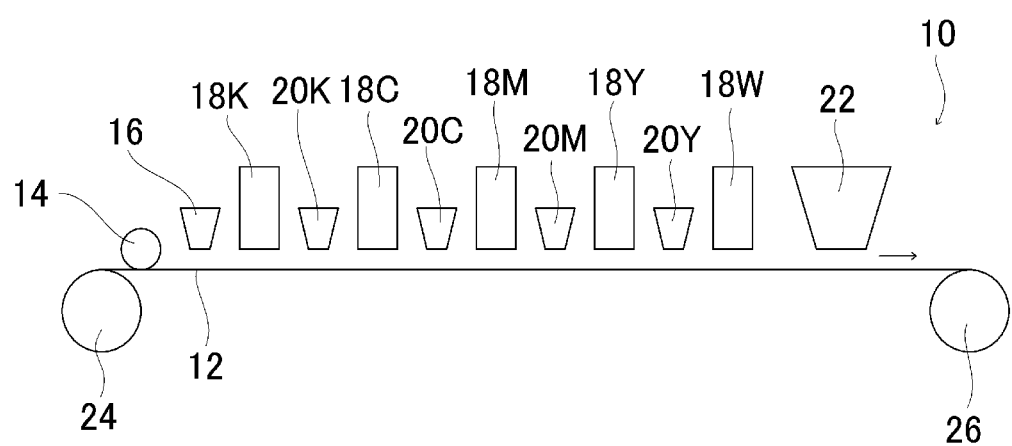
FIG. 2: A schematic drawing showing one example of conventional inkjet recording equipment.

As shown in FIG. 2, a roller applicator was disposed on the most upstream side of a roller transport system, an LED light source was disposed downstream thereof and, further downstream thereof, were disposed a black color head, an LED light source, a cyan color head, an LED light source, a magenta color head, an LED light source, a white color head, and nitrogen-purged exposure equipment.

Each inkjet head employed a DIMATIX Samba 1200 head manufactured by Fujifilm Corporation.

As a substrate (recording medium), OPP (oriented polypropylene) 25 µm, PET 12 µm, and nylon 15 µm were used.

The amount of light of the LED light sources was adjusted so that the undercoat solution and each ink composition were maintained in a semi-cured state.

The printing speed was set at 30 m/min, and the discharge frequency was set so that at that speed a 1,200 dpi image could be formed.

The amount of nitrogen for the nitrogen-purged LED exposure was adjusted so that the oxygen concentration was 1 vol %.

The exposure wavelength of the nitrogen-purged exposure was 365 nm, and the exposure wavelength of other LED light sources was 385 nm. The same applies to the image formation equipment as shown in FIG. 1.

<Image Formation Method 2>

Image formation method 2 was defined as being the same method as image formation method 1 except that as shown in FIG. 1 exposure in the nitrogen-purged exposure was carried out from both the image formation face and the reverse face.

Examples 1 to 8 and Comparative Examples 1 to 29

Images were formed as described in the evaluation method below on each type of substrate using each ink composition and undercoat solution described in Table 3 using the image formation method described in Table 3. The images thus obtained were evaluated by the evaluation methods below. The evaluation results are all shown in Table 3.

<Adhesion Evaluation>

An image was printed with black 50%, cyan 50%, magenta 50%, yellow 50%, and white 100% at 1,200 dpi×1,200 dpi.

A tape peel test was carried out for OPP, PET, and nylon substrates.

1: no peel at all.
2: no peel for at least 95% of the entire image area.
3: no peel for at least 90% but less than 95% of the entire image area.
4: no peel for at least 20% but less than 90% of the entire image area.
5: no peel for at least 0% but less than 20% of the entire image area.

An evaluation of 3 or less would give no problem in practice.

<Flexibility Evaluation (Image Cracking Evaluation)>

An image was printed with black 50%, cyan 50%, magenta 50%, yellow 50%, and white 100% at 1,200 dpi×1,200 dpi.

The printed material thus obtained was held with the hands so that the thumbs were separated by 1 cm from each other, and the material was crumpled ten times by moving the hands in opposite directions from each other once per second along the direction of the face of the printed material, thus carrying out evaluation of flexibility.

1: no cracking occurred in the image area.
2: slight cracking occurred in the image area but could not be identified by eye.
3: cracking in the image area could be identified by eye.
4: a large amount of cracking occurred in the entire image area.

An evaluation of 2 or less would give no problem in practice.

<Image Quality Evaluation>

The character 鷹 was printed in Gothic typeface at 6 pt, 8 pt, and 10 pt.

1: the character could be reproduced at 6 pt.
2: the character could not be reproduced at 6 pt, but the character could be reproduced at 8 pt.
3: the character could not be reproduced at 8 pt, but the character could be reproduced at 10 pt.
4: the character could not be reproduced at 10 pt.

An evaluation of 2 or less would give no problem in practice.

<Odor Evaluation>

An image was printed with black 50%, cyan 50%, magenta 50%, yellow 50%, and white 100% at 1,200 dpi×1,200 dpi. Evaluation of odor was carried out only for OPP.

The odor of a sample that was prepared was evaluated by ten people, and the average value was rounded and used as the evaluation value.

1: no odor was sensed.
2: hardly any odor was sensed.
3: odor was sensed.
4: strong odor was sensed.

An evaluation of 2 or less would give no problem in practice.

TABLE 3

| | Ink composition | Under coat solution | Image formation method | Adhesion OPP | Adhesion PET | Adhesion Nylon | Image cracking OPP | Image cracking PET | Image cracking Nylon | Image quality OPP | Image quality PET | Image quality Nylon | Odor |
|---|---|---|---|---|---|---|---|---|---|---|---|---|---|
| Comp. Ex. 1 | K-1 C-1 M-1 Y-1 W-1 | — | 1 | 5 | 5 | 5 | 4 | 4 | 4 | 4 | 4 | 4 | 2 |
| Comp. Ex. 2 | K-4 C-4 M-4 Y-4 W-4 | — | 1 | 4 | 4 | 4 | 2 | 2 | 2 | 4 | 4 | 4 | 4 |
| Comp. Ex. 3 | K-2 C-2 M-2 Y-2 W-2 | — | 1 | 5 | 5 | 5 | 4 | 4 | 4 | 4 | 4 | 4 | 2 |
| Comp. Ex. 4 | K-1 C-1 M-1 Y-1 W-1 | U-1 | 1 | 5 | 5 | 5 | 4 | 4 | 4 | 1 | 1 | 1 | 2 |
| Comp. Ex. 5 | K-4 C-4 M-4 Y-4 W-4 | U-1 | 1 | 5 | 5 | 5 | 2 | 2 | 2 | 1 | 1 | 1 | 4 |
| Comp. Ex. 6 | K-2 C-2 M-2 Y-2 W-2 | U-1 | 1 | 5 | 5 | 5 | 4 | 4 | 4 | 1 | 1 | 1 | 2 |
| Comp. Ex. 7 | K-1 C-1 M-1 Y-1 W-1 | U-2 | 1 | 5 | 3 | 3 | 4 | 4 | 4 | 1 | 1 | 1 | 2 |
| Comp. Ex. 8 | K-4 C-4 M-4 Y-4 W-4 | U-2 | 1 | 5 | 2 | 2 | 2 | 2 | 2 | 1 | 1 | 1 | 4 |
| Comp. Ex. 9 | K-2 C-2 M-2 Y-2 W-2 | U-2 | 1 | 5 | 2 | 2 | 4 | 4 | 4 | 1 | 1 | 1 | 2 |
| Comp. Ex. 10 | K-1 C-1 M-1 Y-1 W-1 | U-3 | 1 | 3 | 5 | 5 | 4 | 4 | 4 | 1 | 1 | 1 | 2 |
| Comp. Ex. 11 | K-4 C-4 M-4 Y-4 W-4 | U-3 | 1 | 2 | 5 | 5 | 2 | 2 | 2 | 1 | 1 | 1 | 4 |
| Comp. Ex. 12 | K-2 C-2 M-2 Y-2 W-2 | U-3 | 1 | 2 | 5 | 5 | 4 | 4 | 4 | 1 | 1 | 1 | 2 |
| Comp. Ex. 13 | K-1 C-1 M-1 Y-1 W-1 | U-4 | 1 | 3 | 5 | 5 | 4 | 4 | 4 | 1 | 1 | 1 | 2 |
| Comp. Ex. 14 | K-4 C-4 M-4 Y-4 W-4 | U-4 | 1 | 2 | 5 | 5 | 2 | 2 | 2 | 1 | 1 | 1 | 4 |
| Comp. Ex. 15 | K-2 C-2 M-2 Y-2 W-2 | U-4 | 1 | 2 | 5 | 5 | 4 | 4 | 4 | 1 | 1 | 1 | 2 |
| Comp. Ex. 16 | K-1 C-1 M-1 Y-1 W-1 | — | 2 | 5 | 5 | 5 | 4 | 4 | 4 | 4 | 4 | 4 | 1 |
| Comp. Ex. 17 | K-4 C-4 M-4 Y-4 W-4 | — | 2 | 4 | 4 | 4 | 2 | 2 | 2 | 4 | 4 | 4 | 4 |
| Comp. Ex. 18 | K-2 C-2 M-2 Y-2 W-2 | — | 2 | 5 | 5 | 5 | 4 | 4 | 4 | 4 | 4 | 4 | 1 |
| Comp. Ex. 19 | K-1 C-1 M-1 Y-1 W-1 | U-1 | 2 | 5 | 5 | 5 | 4 | 4 | 4 | 1 | 1 | 1 | 1 |
| Comp. Ex. 20 | K-4 C-4 M-4 Y-4 W-4 | U-1 | 2 | 5 | 5 | 5 | 2 | 2 | 2 | 1 | 1 | 1 | 4 |
| Comp. Ex. 21 | K-2 C-2 M-2 Y-2 W-2 | U-1 | 2 | 5 | 5 | 5 | 4 | 4 | 4 | 1 | 1 | 1 | 1 |
| Comp. Ex. 22 | K-1 C-1 M-1 Y-1 W-1 | U-2 | 2 | 4 | 3 | 3 | 4 | 3 | 3 | 1 | 1 | 1 | 1 |
| Comp. Ex. 23 | K-4 C-4 M-4 Y-4 W-4 | U-2 | 2 | 4 | 2 | 2 | 2 | 1 | 1 | 1 | 1 | 1 | 4 |
| Comp. Ex. 24 | K-2 C-2 M-2 Y-2 W-2 | U-2 | 2 | 4 | 2 | 2 | 4 | 1 | 1 | 1 | 1 | 1 | 1 |
| Comp. Ex. 25 | K-1 C-1 M-1 Y-1 W-1 | U-3 | 2 | 3 | 4 | 4 | 3 | 4 | 4 | 1 | 1 | 1 | 1 |
| Comp. Ex. 26 | K-4 C-4 M-4 Y-4 W-4 | U-3 | 2 | 2 | 4 | 4 | 1 | 2 | 2 | 1 | 1 | 1 | 4 |
| Comp. Ex. 27 | K-2 C-2 M-2 Y-2 W-2 | U-3 | 2 | 2 | 4 | 4 | 1 | 4 | 4 | 1 | 1 | 1 | 1 |
| Comp. Ex. 28 | K-1 C-1 M-1 Y-1 W-1 | U-4 | 2 | 3 | 3 | 3 | 3 | 3 | 3 | 1 | 1 | 1 | 1 |
| Comp. Ex. 29 | K-4 C-4 M-4 Y-4 W-4 | U-4 | 2 | 2 | 2 | 2 | 1 | 1 | 1 | 1 | 1 | 1 | 4 |
| Example 1 | K-2 C-2 M-2 Y-2 W-2 | U-4 | 2 | 2 | 2 | 2 | 1 | 1 | 1 | 1 | 1 | 1 | 1 |
| Example 2 | K-3 C-3 M-3 Y-3 W-3 | U-4 | 2 | 2 | 2 | 2 | 1 | 1 | 1 | 1 | 1 | 1 | 1 |
| Example 3 | K-2 C-2 M-2 Y-2 W-2 | U-5 | 2 | 2 | 2 | 2 | 1 | 1 | 1 | 1 | 1 | 1 | 1 |
| Example 4 | K-3 C-3 M-3 Y-3 W-3 | U-5 | 2 | 2 | 2 | 2 | 1 | 1 | 1 | 1 | 1 | 1 | 1 |
| Example 5 | K-2 C-2 M-2 Y-2 W-2 | U-6 | 2 | 1 | 1 | 1 | 1 | 1 | 1 | 1 | 1 | 1 | 1 |
| Example 6 | K-3 C-3 M-3 Y-3 W-3 | U-6 | 2 | 1 | 1 | 1 | 1 | 1 | 1 | 1 | 1 | 1 | 1 |
| Example 7 | K-2 C-2 M-2 Y-2 W-2 | U-7 | 2 | 1 | 1 | 1 | 1 | 1 | 1 | 1 | 1 | 1 | 1 |
| Example 8 | K-3 C-3 M-3 Y-3 W-3 | U-7 | 2 | 1 | 1 | 1 | 1 | 1 | 1 | 1 | 1 | 1 | 1 |

<Image Formation Method 0>

Image formation method 0 was defined as being the same method as image formation method 2 except that a nitrogen purge was not carried out in the nitrogen-purged LED exposure, that is, exposure was carried out under air.

Comparative Examples 30 to 37

Images were formed as described in the evaluation methods on each type of substrate using each ink composition and undercoat solution described in Table 4 by image formation method 0. The images thus obtained were evaluated using the above evaluation methods. The evaluation results are all shown in Table 4.

TABLE 4

| | Ink composition | Under coat solution | Image formation method | Adhesion | | | Image cracking | | | Image quality | | | |
|---|---|---|---|---|---|---|---|---|---|---|---|---|---|
| | | | | OPP | PET | Nylon | OPP | PET | Nylon | OPP | PET | Nylon | Odor |
| Comp. Ex. 30 | K-2 C-2 M-2 Y-2 W-2 | U-4 | 0 | 4 | 4 | 4 | 1 | 1 | 1 | 1 | 1 | 1 | 3 |
| Comp. Ex. 31 | K-3 C-3 M-3 Y-3 W-3 | U-4 | 0 | 4 | 4 | 4 | 1 | 1 | 1 | 1 | 1 | 1 | 3 |
| Comp. Ex. 32 | K-2 C-2 M-2 Y-2 W-2 | U-5 | 0 | 4 | 4 | 4 | 1 | 1 | 1 | 1 | 1 | 1 | 3 |
| Comp. Ex. 33 | K-3 C-3 M-3 Y-3 W-3 | U-5 | 0 | 4 | 4 | 4 | 1 | 1 | 1 | 1 | 1 | 1 | 3 |
| Comp. Ex. 34 | K-2 C-2 M-2 Y-2 W-2 | U-6 | 0 | 4 | 4 | 4 | 1 | 1 | 1 | 1 | 1 | 1 | 3 |
| Comp. Ex. 35 | K-3 C-3 M-3 Y-3 W-3 | U-6 | 0 | 4 | 4 | 4 | 1 | 1 | 1 | 1 | 1 | 1 | 3 |
| Comp. Ex. 36 | K-2 C-2 M-2 Y-2 W-2 | U-7 | 0 | 4 | 4 | 4 | 1 | 1 | 1 | 1 | 1 | 1 | 3 |
| Comp. Ex. 37 | K-3 C-3 M-3 Y-3 W-3 | U-7 | 0 | 4 | 4 | 4 | 1 | 1 | 1 | 1 | 1 | 1 | 3 |

<Image Formation Method 3>

Image formation method 3 was defined as being the same method as image formation method 2 except that the pinning light source after the application roller was replaced by nitrogen-purged exposure equipment such as that disposed immediately beneath the white inkjet head, and a step of complete curing was thus added.

Comparative Examples 38 to 45

Images were formed as described in the above evaluation methods on each type of substrate using each ink composition and undercoat solution described in Table 5 by image formation method 3. The images thus obtained were evaluated using the above evaluation methods. The evaluation results are all shown in Table 5.

TABLE 5

| | Ink composition | Under coat solution | Image formation method | Adhesion | | | Image cracking | | | Image quality | | | |
|---|---|---|---|---|---|---|---|---|---|---|---|---|---|
| | | | | OPP | PET | Nylon | OPP | PET | Nylon | OPP | PET | Nylon | Odor |
| Comp. Ex. 38 | K-2 C-2 M-2 Y-2 W-2 | U-4 | 3 | 5 | 5 | 5 | 4 | 4 | 4 | 4 | 4 | 4 | 2 |
| Comp. Ex. 39 | K-3 C-3 M-3 Y-3 W-3 | U-4 | 3 | 5 | 5 | 5 | 4 | 4 | 4 | 4 | 4 | 4 | 2 |
| Comp. Ex. 40 | K-2 C-2 M-2 Y-2 W-2 | U-5 | 3 | 5 | 5 | 5 | 4 | 4 | 4 | 4 | 4 | 4 | 2 |
| Comp. Ex. 41 | K-3 C-3 M-3 Y-3 W-3 | U-5 | 3 | 5 | 5 | 5 | 4 | 4 | 4 | 4 | 4 | 4 | 2 |
| Comp. Ex. 42 | K-2 C-2 M-2 Y-2 W-2 | U-6 | 3 | 5 | 5 | 5 | 4 | 4 | 4 | 4 | 4 | 4 | 2 |
| Comp. Ex. 43 | K-3 C-3 M-3 Y-3 W-3 | U-6 | 3 | 5 | 5 | 5 | 4 | 4 | 4 | 4 | 4 | 4 | 2 |
| Comp. Ex. 44 | K-2 C-2 M-2 Y-2 W-2 | U-7 | 3 | 5 | 5 | 5 | 4 | 4 | 4 | 4 | 4 | 4 | 2 |
| Comp. Ex. 45 | K-3 C-3 M-3 Y-3 W-3 | U-7 | 3 | 5 | 5 | 5 | 4 | 4 | 4 | 4 | 4 | 4 | 2 |

It can be seen from Table 5 that if the undercoat solution is completely solidified, sufficient good adhesion and image quality cannot be obtained.

What is claimed is:

1. An inkjet recording method comprising:
    an undercoating step of applying an undercoat solution onto a transparent recording medium,
    a semi-curing step of semi-curing the undercoat solution,
    an image formation step of carrying out image formation by discharging an ink composition onto the semi-cured undercoat solution, and
    an overall curing step of carrying out overall curing of the semi-cured undercoat solution and the ink composition by exposure under an atmosphere having an oxygen concentration of no greater than 1 vol % after the image formation,
    the undercoat solution comprising two or more types of polymers and/or oligomers from among polymers and oligomers having a structure selected from the group consisting of a polyester structure, a polyurethane structure, and a chlorinated polyolefin structure; an ethylenically unsaturated compound; and a polymerization initiator,
    the ink composition comprising an ethylenically unsaturated compound and a polymerization initiator,
    the ink composition comprising at least 95 parts by mass of a polyfunctional ethylenically unsaturated compound relative to 100 parts by mass of the total content of ethylenically unsaturated compound in the ink composition, and at least 5 parts by mass of a polyalkylene glycol diacrylate as the polyfunctional ethylenically unsaturated compound, and
    exposure in the overall curing step being carried out from both the image formation face and the reverse face of the recording medium.

2. The inkjet recording method according to claim 1, wherein the exposure wavelength in the semi-curing step is different from the exposure wavelength in the overall curing step.

3. The inkjet recording method according to claim 1, wherein the undercoat solution comprises two or more types of polymerization initiators.

4. The inkjet recording method according to claim 3, wherein the undercoat solution comprises at least one type of polymerization initiator having a main absorption in the vicinity of the exposure wavelength in the semi-curing step and at least one type of polymerization initiator having a main absorption in the vicinity of the exposure wavelength in the overall curing step, as the polymerization initiator.

5. The inkjet recording method according to claim 1, wherein the undercoat solution comprises at least one type of polymerization initiator that does not decompose in the semi-curing step but does decompose in the overall curing step.

6. The inkjet recording method according to claim 1, wherein the undercoat solution comprises 2-methyl-1-(4-methylthiophenyl)-2-morpholinopropan-1-one and a compound selected from the group consisting of 2-benzyl-2-dimethylamino-1-(4-morpholinophenyl)-1-butanone, 2-(dimethylamino)-2-[(4-methylphenyl)methyl]-1-[4-(4-morpholinyl)phenyl]-1-butanone, bis(2,4,6-trimethylbenzoyl)phenylphosphine oxide, and bis(2,6-dimethoxybenzoyl)-2,4,4-trimethylpentylphenylphosphine oxide, as the polymerization initiator.

7. The inkjet recording method according to claim 1, wherein the polymer or oligomer having at least a structure selected from the group consisting of a polyester structure, a polyurethane structure, and a chlorinated polyolefin structure comprises an ethylenically unsaturated group.

8. The inkjet recording method according to claim 7, wherein the polymer or oligomer having at least a structure selected from the group consisting of a polyester structure, a polyurethane structure, and a chlorinated polyolefin structure comprises a (meth)acryloxy group.

9. The inkjet recording method according to claim 1, wherein the ink composition comprises a hydrocarbon diol di(meth)acrylate as the ethylenically unsaturated compound.

10. The inkjet recording method according to claim 1, wherein the ink composition comprises a compound represented by Formula (1) or Formula (2) below, as the polymerization initiator,

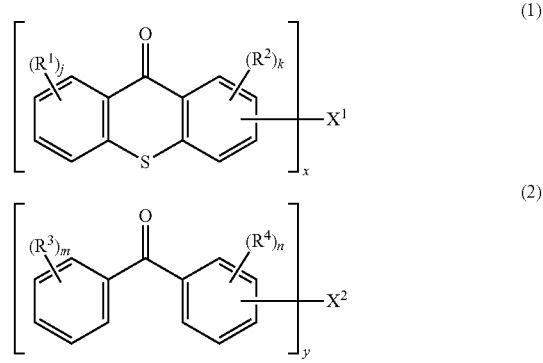

wherein in Formula (1) and Formula (2), $R^1$, $R^2$, $R^3$, and $R^4$ independently denote an alkyl group having 1 to 5 carbons or a halogen atom, x and y independently denote an integer of 2 to 4, j and m independently denote an integer of 0 to 4, k and n independently denote an integer of 0 to 3, when j, k, m, or n is an integer of 2 or more, the plurality of $R^1$s, $R^2$s, $R^3$s, or $R^4$s may be identical to or different from each other, $X^1$ denotes an x-valent linking group comprising at least any one of a hydrocarbon chain, an ether bond, and an ester bond, and $X^2$ denotes a y-valent linking group comprising at least any one of a hydrocarbon chain, an ether bond, and an ester bond.

11. The inkjet recording method according to claim 1, wherein the exposure in the semi-curing step and the exposure in the overall curing step are each exposure by a LED light source.

12. The inkjet recording method according to claim 1, wherein the exposure in the semi-curing step is exposure by a LED light source with a peak wavelength of 385 nm, and the exposure in the overall curing step is exposure by a LED light source with a peak wavelength of 365 nm.

* * * * *